(12) United States Patent
Grokop et al.

(10) Patent No.: US 9,301,264 B2
(45) Date of Patent: Mar. 29, 2016

(54) BEACON TRANSMIT POWER SCHEMES

(71) Applicant: QUALCOMM Incorporated, San Diego, CA (US)

(72) Inventors: Leonard Henry Grokop, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 14/253,714

(22) Filed: Apr. 15, 2014

(65) Prior Publication Data

US 2014/0228069 A1 Aug. 14, 2014

Related U.S. Application Data

(62) Division of application No. 12/841,497, filed on Jul. 22, 2010, now Pat. No. 8,725,192.

(60) Provisional application No. 61/228,475, filed on Jul. 24, 2009.

(51) Int. Cl.
*H04W 52/26* (2009.01)
*H04W 52/32* (2009.01)
(Continued)

(52) U.S. Cl.
CPC .......... *H04W 52/265* (2013.01); *H04W 52/325* (2013.01); *H04W 24/02* (2013.01); *H04W 36/04* (2013.01); *H04W 52/242* (2013.01); *H04W 84/045* (2013.01)

(58) Field of Classification Search
CPC ... H04W 24/02; H04W 36/04; H04W 52/242; H04W 52/325; H04W 84/045; H04W 52/00; H04W 52/24; H04W 52/241; H04W 52/243; H04W 52/245; H04W 52/246; H04W 52/247; H04W 52/248

USPC ............. 455/522, 69, 434, 435.1, 67.11, 574, 455/513, 444, 423; 370/338, 331, 342, 410, 370/435.1, 329, 229, 352, 349, 436; 375/260, 299

See application file for complete search history.

(56) References Cited

U.S. PATENT DOCUMENTS 7,388,845 B2 6/2008 Laroia et al.
7,756,548 B2 7/2010 Laroia et al.
(Continued)

FOREIGN PATENT DOCUMENTS

CN  1792108 A  6/2006
CN  101124839 A  2/2008
(Continued)

OTHER PUBLICATIONS

Cisco Systems, Inc., "Internetworking Technologies Handbook (3rd Edition)," First Edition, Sep. 30, 2003, Softbank Publishing Inc., p. 316, ISBN: 4-7973-1777-9 (note especially the explanation of "path loss" in lines 7-9 from the bottom of p. 316).

(Continued)

*Primary Examiner* — Tan Trinh

(57) ABSTRACT

In a multi-level power transmission scheme, an access point transmits at one power level, while repeatedly transmitting at a burst power level for short periods of time. For example, a femto cell may transmit a beacon with periodic high power bursts of short duration, while the femto cell transmit power also undergoes high power bursts aligned with the beacon bursts. In a network listen-based power control scheme, an access point listens for one or more parameters sent over-the-air by the network and then defines transmit power based on the received parameter(s). In some aspects, beacon transmit power may be set based on a defined outage radius parameter and the total received signal power on a channel. In some aspects, access point transmit power may be set based on a defined coverage parameter and the received energy associated with signals from access points of a certain type.

17 Claims, 16 Drawing Sheets

(51) Int. Cl.
*H04W 24/02* (2009.01)
*H04W 36/04* (2009.01)
*H04W 52/24* (2009.01)
*H04W 84/04* (2009.01)

(56) References Cited

U.S. PATENT DOCUMENTS

| | | | |
|---|---|---|---|
| 7,974,658 B2 | 7/2011 | Hunziker | |
| 8,244,296 B2 | 8/2012 | Dorsey et al. | |
| 8,355,725 B2 | 1/2013 | Nylander et al. | |
| 8,498,242 B2 | 7/2013 | Luo et al. | |
| 8,520,567 B2 | 8/2013 | Li et al. | |
| 8,804,677 B2 | 8/2014 | Corson et al. | |
| 2004/0229621 A1 | 11/2004 | Misra | |
| 2005/0152320 A1* | 7/2005 | Marinier et al. | 370/338 |
| 2006/0040663 A1 | 2/2006 | Ise et al. | |
| 2006/0135189 A1* | 6/2006 | Nagaraj et al. | 455/513 |
| 2006/0258386 A1 | 11/2006 | Jeong et al. | |
| 2007/0004445 A1* | 1/2007 | Dorsey et al. | 455/525 |
| 2007/0111790 A1 | 5/2007 | Maekawa et al. | |
| 2007/0127369 A1* | 6/2007 | Sebire | 370/229 |
| 2007/0168326 A1 | 7/2007 | Das et al. | |
| 2007/0248033 A1 | 10/2007 | Bejerano et al. | |
| 2007/0248059 A1 | 10/2007 | Jain et al. | |
| 2007/0268869 A1 | 11/2007 | Lundby et al. | |
| 2008/0008161 A1* | 1/2008 | Aldaz et al. | 370/352 |
| 2008/0186938 A1 | 8/2008 | Okazaki | |
| 2009/0042594 A1 | 2/2009 | Yavuz et al. | |
| 2009/0074094 A1* | 3/2009 | Palanki et al. | 375/260 |
| 2009/0075664 A1 | 3/2009 | Palanki et al. | |
| 2009/0086672 A1 | 4/2009 | Gholmieh et al. | |
| 2009/0093232 A1 | 4/2009 | Gupta et al. | |
| 2009/0094351 A1 | 4/2009 | Gupta et al. | |
| 2009/0094680 A1 | 4/2009 | Gupta et al. | |
| 2009/0129332 A1 | 5/2009 | Dayal et al. | |
| 2009/0129341 A1 | 5/2009 | Balasubramanian et al. | |
| 2010/0048212 A1* | 2/2010 | Yavuz et al. | 455/436 |
| 2010/0098036 A1* | 4/2010 | Li | 370/338 |
| 2010/0157910 A1* | 6/2010 | Nentwig et al. | 370/329 |
| 2010/0246544 A1* | 9/2010 | Brisebois et al. | 370/338 |
| 2010/0278141 A1* | 11/2010 | Choi-Grogan et al. | 370/331 |
| 2010/0279686 A1* | 11/2010 | Tokgoz et al. | 455/435.1 |
| 2011/0170432 A1 | 7/2011 | Grokop et al. | |
| 2011/0177808 A1 | 7/2011 | Grokop et al. | |
| 2011/0206017 A1 | 8/2011 | Taghavi et al. | |
| 2011/0211562 A1 | 9/2011 | Taghavi et al. | |
| 2011/0211616 A1 | 9/2011 | Taghavi et al. | |
| 2012/0083246 A1* | 4/2012 | Huber et al. | 455/411 |
| 2012/0108256 A1 | 5/2012 | Bray | |
| 2012/0177024 A1 | 7/2012 | Maekawa et al. | |
| 2013/0064234 A1* | 3/2013 | Aldaz et al. | 370/338 |
| 2013/0288689 A1* | 10/2013 | Choi-Grogan et al. | 455/444 |

FOREIGN PATENT DOCUMENTS

| | | |
|---|---|---|
| CN | 101243616 A | 8/2008 |
| JP | 2003179611 A | 6/2003 |
| JP | 2003244161 | 8/2003 |
| JP | 2006060322 A | 3/2006 |
| JP | 2006340008 A | 12/2006 |
| JP | 2008295045 A | 12/2008 |
| JP | 2009033532 A | 2/2009 |
| JP | 2009171568 A | 7/2009 |
| JP | 2009534929 A | 9/2009 |
| JP | 2009542043 A | 11/2009 |
| KR | 20060005362 A | 1/2006 |
| WO | WO-2007035447 | 3/2007 |
| WO | WO-2007082035 A2 | 7/2007 |
| WO | WO-2007147121 A2 | 12/2007 |
| WO | WO-2008058150 A2 | 5/2008 |
| WO | WO-2008098898 A2 | 8/2008 |
| WO | WO-2009045969 | 4/2009 |
| WO | WO-2009067389 | 5/2009 |

OTHER PUBLICATIONS

International Search Report and Written Opinion—PCT/US2010/043269, International Search Authority—European Patent Office—Dec. 20, 2010.

Kobayashi, T., "Goldsmith Wireless Communications," Aug. 10, 2007, Maruzen Company, Limited, pp. 42-46, ISBN: 978-4-621-07847-1 (note especially descriptions regarding "path loss" in the explanations of equations (2.4), (2.5) and (2.9)).

Saito, T., et al., "Trends in LTE/WiMAX systems," Fujitsu, vol. 60, No. 4, Fujitsu Limited, Jul. 10, 2009, pp. 304-309, ISSN: 0016-2515.

Taiwan Search Report—TW099124565—TIPO—Apr. 18, 2013.

3rd Generation Partnership Project; Technical Specification Group Radio Access Network; User Equipment (UE) procedures in idle mode and procedures for cell reselection in connected mode (Release 8), 3GPP Standard; 3GPP TS 25.304, 3rd Generation Partnership Project (3GPP), Mobile Competence Centre ; 650, Route Des Lucioles ; F-06921 Sophia-Antipolis Cedex ; France, No. V8.6.0, Jun. 1, 2009, pp. 1-49, XP050367397.

* cited by examiner

BEACON TRANSMIT POWER SCHEMES

CLAIM OF PRIORITY

The present Application for Patent is a Divisional of patent application Ser. No. 12/841,497 entitled "BEACON TRANSMIT POWER SCHEMES," filed Jul. 22, 2010, claiming the benefit of and priority to commonly owned U.S. Provisional Patent Application No. 61/228,475 entitled "NETWORK LISTEN BASED FEMTOCELL AND BEACON POWER CALIBRATION FOR WCDMA/UMTS," filed Jul. 24, 2009. The disclosures of the prior applications are hereby incorporated by reference herein in their entirety.

CROSS-REFERENCE TO RELATED APPLICATION

This application is related to commonly owned U.S. patent application Ser. No. 12/841,549 entitled "ACCESS POINT TRANSMIT POWER SCHEMES," filed Jul. 22, 2010, the disclosure of which is hereby incorporated by reference herein in its entirety.

BACKGROUND

1. Field

This application relates generally to wireless communication and more specifically, but not exclusively, to transmit power control schemes.

2. Introduction

A wireless communication network may be deployed over a defined geographical area to provide various types of services (e.g., voice, data, multimedia services, etc.) to users within that geographical area. In a typical implementation, access points (e.g., corresponding to different macro cells) are distributed throughout a network to provide wireless connectivity for access terminals (e.g., cell phones) that are operating within the geographical area served by the network.

As the demand for high-rate and multimedia data services rapidly grows, there lies a challenge to implement efficient and robust communication systems with enhanced performance. To supplement conventional network access points (e.g., macro access points), small-coverage access points may be deployed (e.g., installed in a user's home) to provide more robust indoor wireless coverage or other coverage to mobile units. Such small-coverage access points may be referred to as, for example, femto cells, femto access points, access point base stations, home NodeBs, or home eNodeBs. Typically, such small-coverage base stations are connected to the Internet and the mobile operator's network via a DSL router or a cable modem.

In general, at a given point in time, an access terminal will be served by a given one of the access points in a network. As the access terminal roams throughout the network, the access terminal may move closer to another access point. Under certain circumstances, the access terminal may then reselect to the other access point (e.g., be handed-over from its current serving access point to the other access point). For example, to enable an access terminal to access the services provided by an associated femto cell (e.g., a home femto cell), it may be desirable to hand-over the access terminal from a current serving macro cell to the femto cell as soon as the access terminal enters the coverage area of the femto cell.

Accordingly, there is a need for techniques to ensure that an access terminal (e.g., idle user equipment) consistently discovers and reselects to a femto cell when the access terminal arrives at the femto cell. Moreover, it is desirable to achieve this irrespective of the location of the femto cell (e.g., the proximity of the femto cell to the macro access point) and without significantly affecting the coverage of the macro cell (e.g., without creating outage areas for access terminals communicating with the macro cell).

SUMMARY

A summary of sample aspects of the disclosure follows. In the discussion herein, reference to the term aspects may refer to one or more aspects of the disclosure.

The disclosure relates in some aspects to techniques for determining transmit power for an access point. Various techniques are described for defining transmit power in a manner that facilitates discovery of an access point by a nearby access terminal, while mitigating any negative impact that transmissions by the access point may have on service provided by a neighboring access point. For example, transmit power may be defined for a femto cell in a manner that facilitates reselection to that femto cell by access terminals authorized to access the femto cell, while mitigating outages (e.g., call drops) at access terminals accessing a nearby macro cell that may otherwise occur as a result of the transmissions by the femto cell.

The disclosure relates in some aspects to a multi-level power transmission scheme. For example, an access point may usually transmit at a certain power level, but then occasionally (e.g., periodically) transmit at a burst power level (i.e., a higher power level) for short periods of time. In some aspects, this multi-level power scheme may be used for normal access point transmissions (e.g., data transmissions) and/or for beacon transmissions. As a specific example, a femto cell may transmit a jamming beacon on a macro cell frequency with periodic high power bursts of short duration. In addition, the femto cell transmit power also may undergo periodic high power bursts.

The disclosure relates in some aspects to transmitting bursts in a synchronized manner. For example, a femto cell may be configured such that the femto cell's transmit power bursts are synchronized (e.g., aligned) with the femto cell's beacon bursts. The use of such synchronized bursts may facilitate reselection to the femto cell by any authorized access terminals in the vicinity of the femto cell. For example, upon detecting a beacon burst from a femto cell, an access terminal may commence searching for other transmissions (e.g., pilot signals) from the femto cell. Since these other transmissions will be sent at a higher power during the burst period in accordance with the teachings herein, the access terminal will be able to more readily acquire these signals from the femto cell. Consequently, upon acquisition of these signals (e.g., pilot signals), the access terminal may initiate reselection to the femto cell.

The disclosure relates in some aspects to network listen-based power control. Here, an access point may listen for one or more parameters sent over-the-air by the network (e.g., by a macro cell) and then define one or more transmit power values based on the received parameter(s). For example, beacon burst power at a femto cell may be set based on an Sintersearch parameter broadcast by a macro cell. Also, femto cell power or beacon power may be set based on a Qqualmin parameter broadcast by a macro cell.

The disclosure relates in some aspects to determining beacon transmit power based on total received signal power on a channel and based on a defined outage radius parameter. For example, beacon power at a femto cell may be set based on the total received signal power measured on a macro channel at the femto cell and based on a parameter representing the path loss from the femto cell at which the femto cell beacon will likely cause macro cell Ecp/Io at an access terminal to fall below a specified minimum value (e.g., Qqualmin).

The disclosure relates in some aspects to determining access point transmit power based on the received energy associated with signals from access points of a certain type and based on a defined coverage parameter. For example, femto cell power at a femto cell may be set based on the energy received from all macro cells on a channel and based on a path loss parameter representative of the boundary of the coverage of the femto cell.

BRIEF DESCRIPTION OF THE DRAWINGS

These and other sample aspects of the disclosure will be described in the detailed description and the appended claims that follow, and in the accompanying drawings, wherein:

Figure 1:
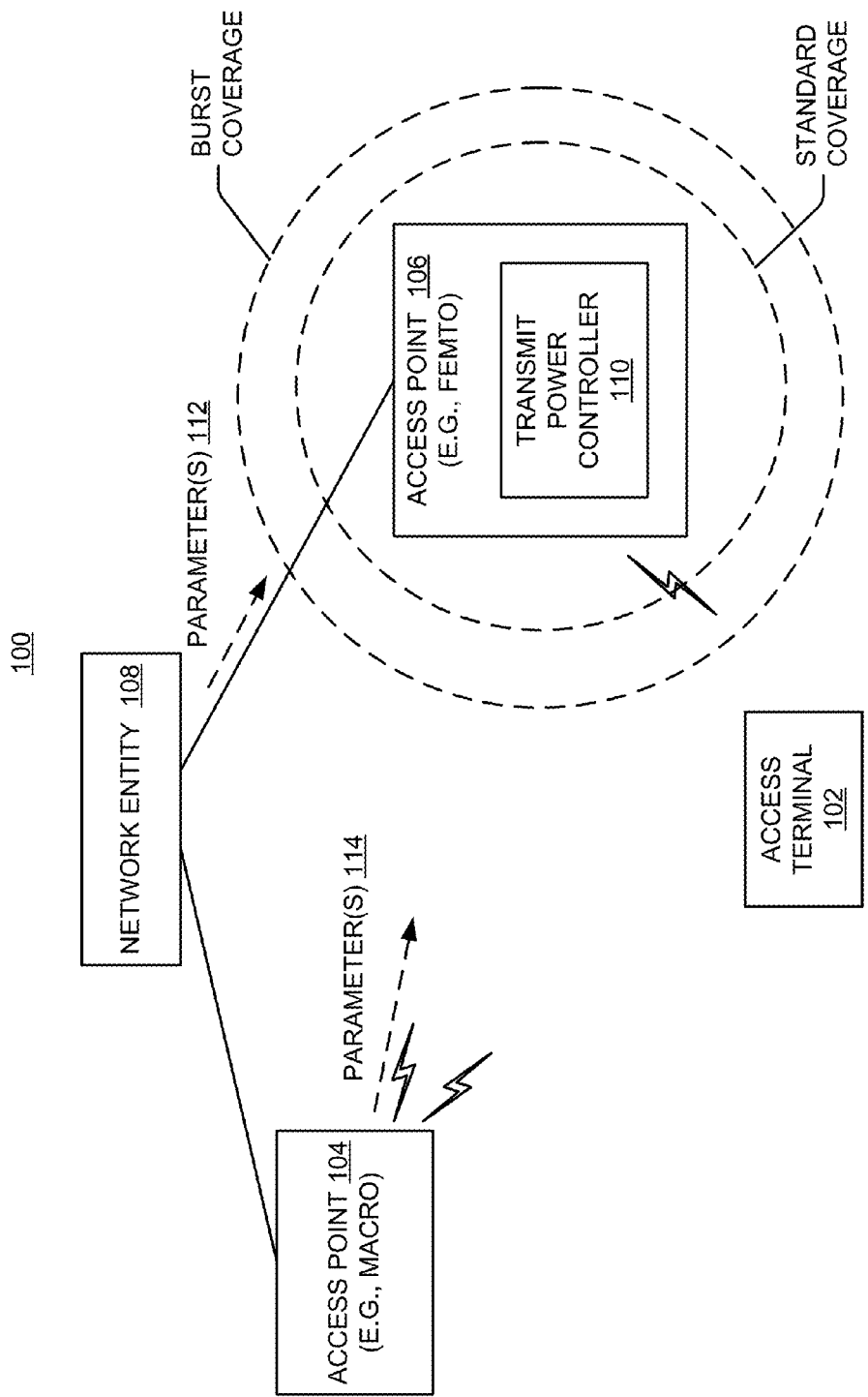
FIG. 1 is a simplified block diagram of several sample aspects of a communication system adapted to provide multi-level power control.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, macro cells, femto cells, NodeBs, and so on, while access terminals may be referred to or implemented as user equipment, mobiles, and so on.

Access points in the system 100 provide one or more services (e.g., network connectivity) for one or more wireless terminals (e.g., access terminal 102) that may be installed within or that may roam throughout a coverage area of the system 100. For example, at various points in time the access terminal 102 may connect to an access point 104, an access point 106, or some other access point in the system 100 (not shown). Each of the access points may communicate with one or more network entities (represented, for convenience, by the network entity 108) to facilitate wide area network connectivity. A network entity may take various forms such as, for example, one or more radio and/or core network entities. Thus, in various implementations the network entity 108 may represent functionality such as at least one of: network management (e.g., via an operation, administration, management, and provisioning entity), call control, session management, mobility management, gateway functions, interworking functions, or some other suitable network functionality.

In accordance with the teachings herein, the access point 106 (e.g., a femto cell) may employ a multi-level power scheme whereby different transmit power levels are used at different times. For example, the access point may transmit at one power level to provide standard coverage as represented in a simplified manner by the corresponding dashed line. In addition, the access point may transmit at a higher power level to provide burst coverage as represented in a simplified manner by the corresponding dashed line.

For purposes of illustration, various aspects of FIG. 1 are not drawn to scale. For example, the standard coverage and burst coverage are not drawn to scale and are represented as simple circles in FIG. 1. It should be appreciated that in practice such coverage would be more complex in shape and that the burst coverage may be significantly wider than the standard coverage. In addition, the distances between the entities of FIG. 1 are not drawn to scale.

The access point 106 may employ the multi-level power scheme for normal transmissions (e.g., data transmissions on a femto channel) and for beacon transmissions (e.g., beacon transmission on a macro channel). For example, the access point 106 may normally transmit on a given channel at a certain power level, then occasionally transmit at a higher power level (i.e., transmit bursts). In addition, the access point 106 may normally transmit beacons on one or more macro channels at a certain power level, then occasionally transmit beacons at a higher power level on those channels (i.e., transmit beacon bursts).

The access point 106 may set its transmit power levels based on one or more parameters received from the network. For example, a transmit power controller 110 of the access point 106 may define a standard transmit power level based on a parameter 112 received via the backhaul (e.g., received from the access point 104 via the network entity 108). In addition, the transmit power controller 110 may define a beacon transmit power level and/or a beacon burst transmit power level based on one or more parameters 114 received over-the-air from the access point 104 (e.g., from a macro access point within the coverage of which the access point 106 lies).

As a specific example, the power levels of regular femto cell transmission, regular beacon, beacon burst, and femto cell burst may be calibrated based on measurements of macro signal strength and total received signal power. The regular beacon power is set such that a fixed (small) outage radius is created. If the network operator has set the parameter Sintersearch>0 for the macro cells, then the beacon coverage radius (radius at which an inter-frequency search is triggered) will be larger than the outage radius. The beacon burst power is set based on the macro cell Sintersearch parameter to maintain a consistent triggering of inter-frequency cell search at the femto cell deployment location boundary (e.g., apartment, home, or office boundary), regardless of the location of the femto cell within the macro cell. The femto cell power is set based on the Qqualmin parameter broadcast by the macro network on system information block (SIB) 11 for that femto cell pilot scrambling code (PSC), such that an access terminal within the boundary of the apartment/home/office will have sufficient femto cell coverage to be able to reselect to the femto cell. In this way, consistent discovery of the femto cell by home access terminals (e.g., access terminals that belong to the whitelist of the femto cell) arriving home may be ensured, whilst minimizing outage to macro access terminals (e.g., access terminals that do not belong to that whitelist), regardless of the location of the femto cell within the macro cell.

The teachings herein may be used in a variety of deployment schemes. For example, the teachings herein may be used in a co-channel deployment scheme where a macro access point and a femto access point operate on the same channel (e.g., frequency f1), and where at least one macro access point operates on one or more other channels (e.g., frequency f2). The teachings herein also may be used in a dedicated channel deployment scheme where a femto access point operates on one channel (e.g., frequency f1) and one or more macro access points operate on one or more other channels (e.g., frequency f2). For purposes of illustration, the discussion that follows primarily describes a co-channel deployment scheme.

In some aspects, the term "channel: as used herein refers to a particular frequency band (e.g., corresponding to a designated nominal frequency) allocated by the network. Conventionally such a channel may be referred to as a frequency. For example, the channel on which a femto cell operates may be referred to as the femto frequency, while the channel on which a macro cell operates may be referred to as the macro frequency.

Sample operations that may be perform by an access point such as the access point 106 will now be described in more detail in conjunction with the flowcharts of FIGS. 2 and 4-7.

Figure 6:
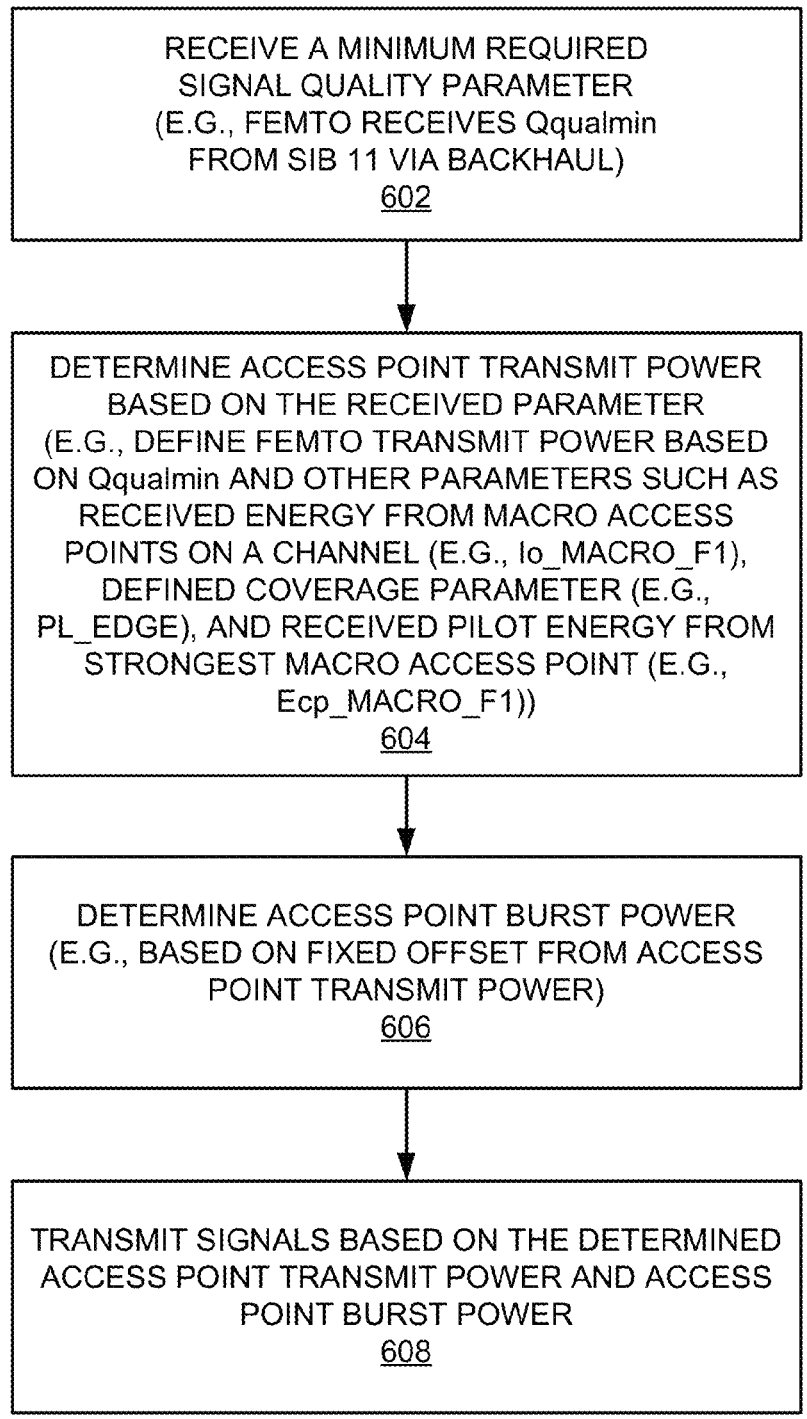
FIG. 6 is a flowchart of several sample aspects of operations that may be performed to determine access point transmit power based on a received parameter.
Figure 7:
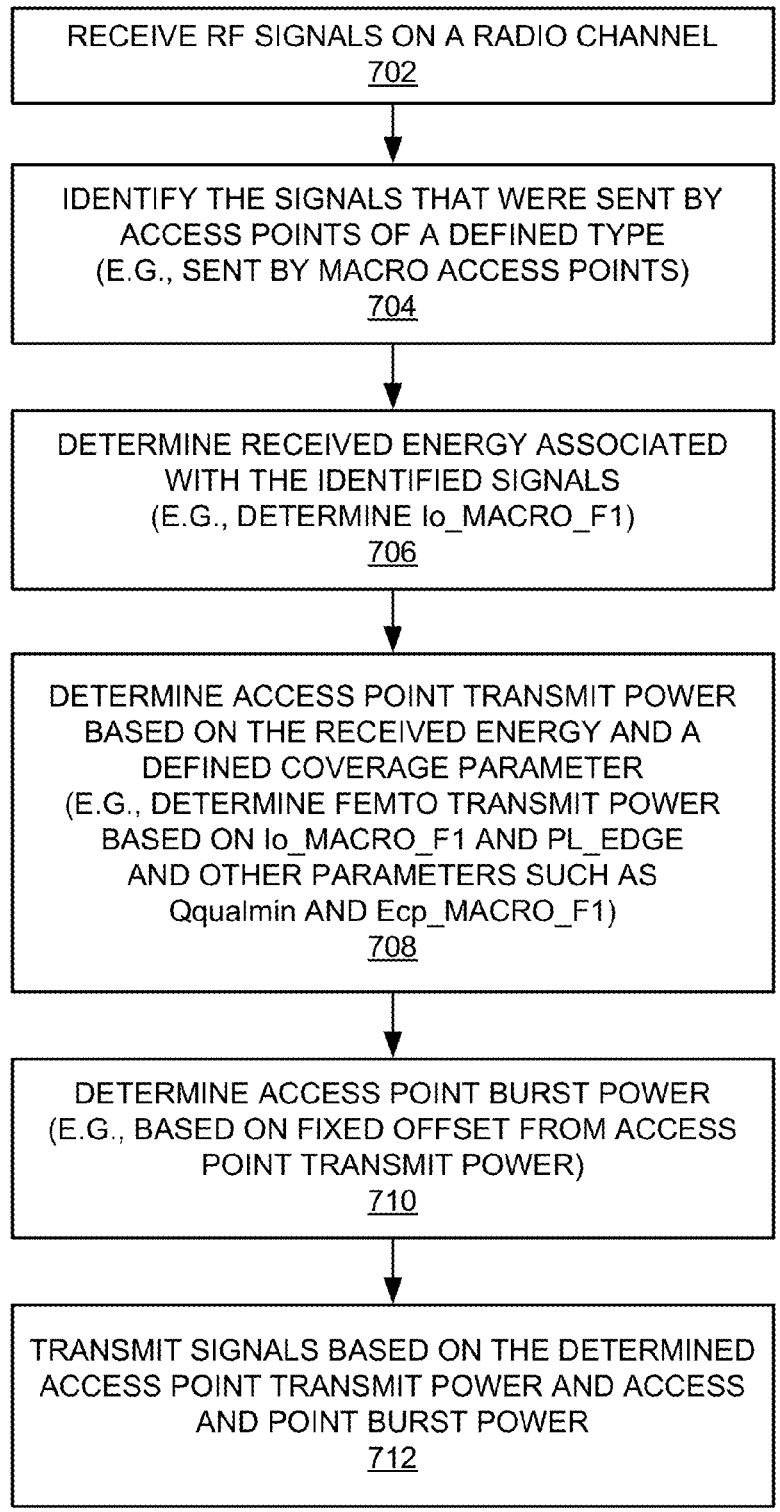
FIG. 7 is a flowchart of several sample aspects of operations that may be performed to determine access point transmit power based on received energy and a defined coverage parameter.
Figure 8:
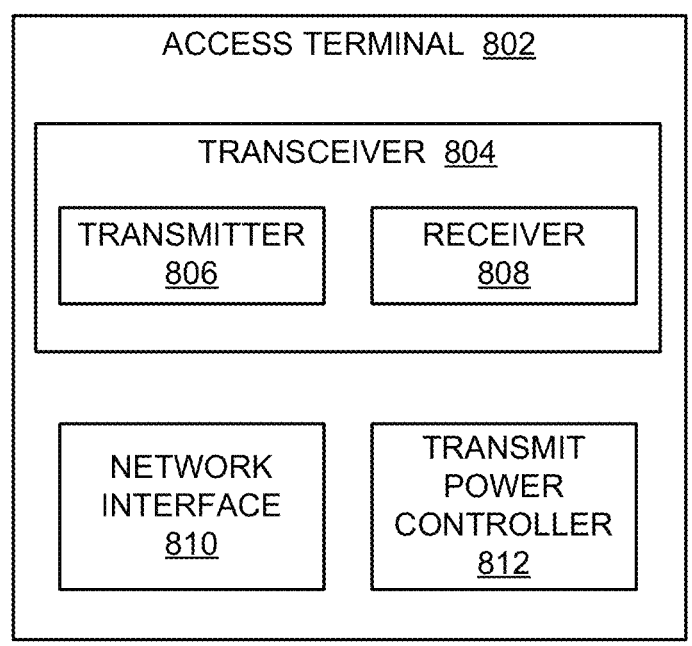
FIG. 8 is a simplified block diagram of several sample aspects of components that may be employed in communication nodes.

For convenience, the operations of FIGS. 2 and 4-7 (or any other operations discussed or taught herein) may be described as being performed by specific components (e.g., the components of FIG. 1 or FIG. 8). It should be appreciated, however, that these operations may be performed by other types of components and may be performed using a different number of components. It also should be appreciated that one or more of the operations described herein may not be employed in a given implementation.

Figure 2:
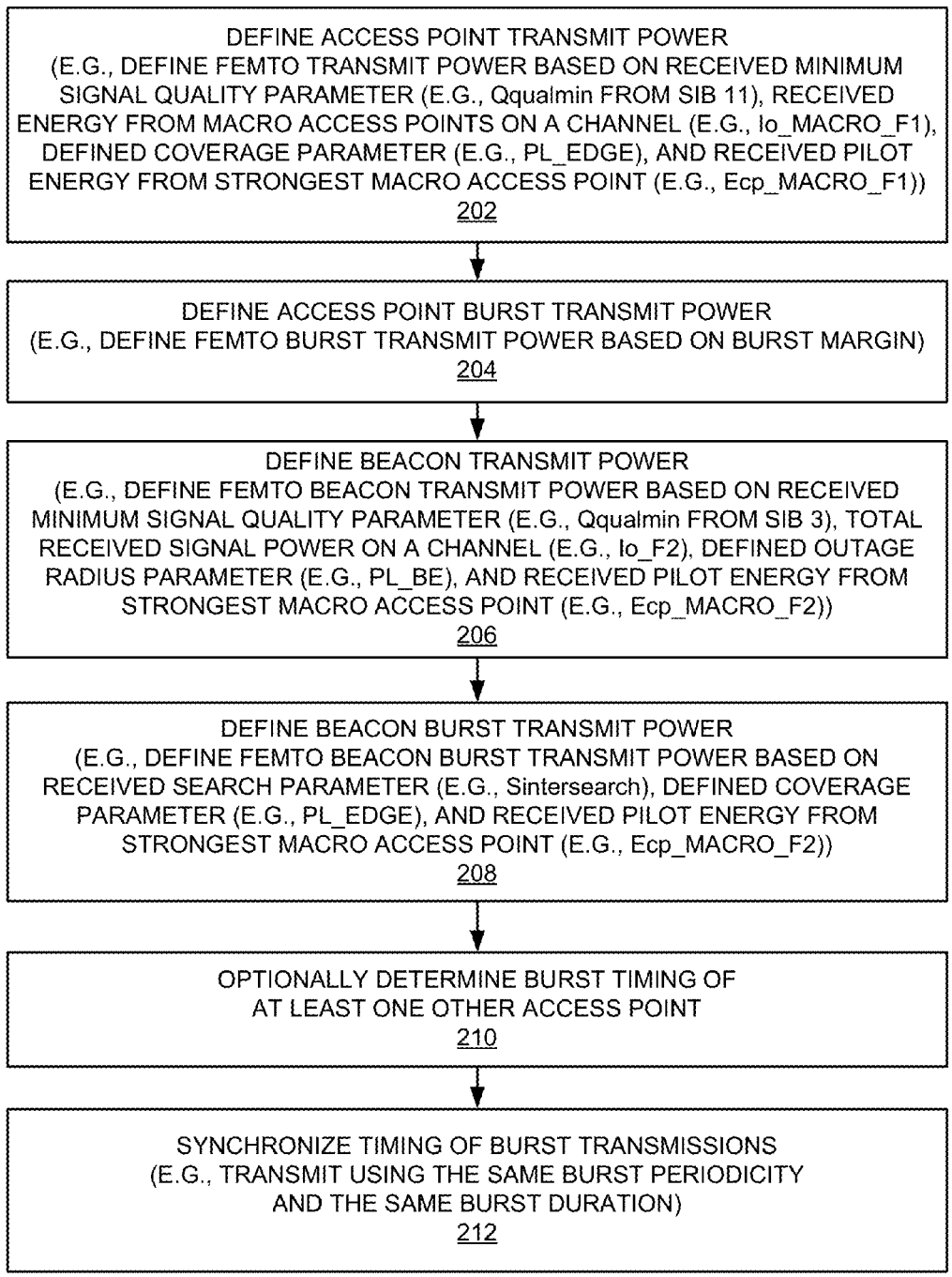
FIG. 2 is a flowchart of several sample aspects of operations that may be performed to provide synchronized burst transmissions.

FIG. 2 describes sample operations that may be performed in conjunction with an access point providing synchronized burst transmissions. Initially, standard and burst power levels are defined for normal transmissions and beacon transmission. Then, the access point synchronizes the transmissions of the bursts.

For purposes of illustration the operations of FIG. 2 will be described in the context of a femto cell (i.e., a femto access point). In some aspects, femto cell power calibration (e.g., setting the femto transmit power on the femto frequency f1) is designed to provide adequate femto cell coverage for home access terminals whilst at the same time limiting interference to, and reselection attempts by, macro access terminals that may be situated just outside the coverage radius of the femto cell. In addition, beacon power calibration (e.g., setting the jamming beacon transmit power on the macro frequency f2) is designed to both facilitate discovery of the femto cell by home access terminals, and prevent discovery of the femto cell by macro access terminals in the vicinity of the femto cell.

In the example that follows, power calibration consists of computing four values: 1) femto cell transmit power on f1; 2) femto cell burst power on f1; 3) beacon power on f2; and 4) beacon burst power on f2. Both the beacon and femto transmit powers undergo periodic, momentary bursts, according to a defined burst period where each burst lasts a defined burst duration. As discussed in herein, through the use of such bursts, a home access terminal may more readily discover its associated femto cell. The beacon and femto burst are synchronized to occur at the same time and have the same duration. As discussed in more detail below, in some implementations the bursts are time-synchronized across the network (i.e., among other access points). In this way, a given access terminal may respond only to the burst emanating from the femto cell nearest that access terminal.

The burst period may be defined in various ways. In some implementations the burst period is selected as follows: burst duration=N×DRX_cycle_duration, where N is the number of consecutive DRX cycles that the reselection criteria need to be satisfied for, in order for cell reselection to take place, as given by the Treselection parameter of the strongest serving macro cell (e.g., as seen at the femto cell). In a sample implementation, a burst duration on the order of 1-2 minutes is used.

Referring to FIG. 2, as represented at block 202, at some point in time access point transmit power is defined. For example, a femto cell may determine the power at which it will normally transmit on the femto frequency (e.g., frequency f1). Linear units are used in the equations that follow.

The femto cell computes an estimate of the total received signal power from macro cells (e.g., excluding contributions from other femto cells), on the femto cell frequency f1 according to the following equation:

$$\text{Io\_macro\_f1} = \frac{\sum_{i \in \text{macro\_PSC\_list\_f1}} \text{Ecp\_macro\_f1}(i)}{Ecp/\text{Ior\_macro}}$$

Here, macro_PSC_list_f1 is the list of macro PSCs on f1, Ecp_macro_f1(i) is the received pilot energy of the $i^{th}$ macro PSC on f1, and Ecp/Ior_macro is a parameter corresponding to the estimated ratio of pilot power to total power for macro cells. The femto cell computes the transmit power according to the following equations:

$$\text{P\_femto1} = \left(\frac{\text{Ecp\_macro\_f1}}{Ecp/\text{Io\_min}} - \text{Io\_macro\_f1}\right) \cdot \text{PL\_edge}$$

$$\text{P\_femto2} = \frac{\text{Qqualmin\_femto}}{\text{pilot\_gain} - \text{Qqualmin\_femto}} \cdot \text{Io\_macro\_f1} \cdot \text{PL\_edge}$$

$$\text{P\_femto3} = \min(\text{P\_femto1}, \text{P\_femto2})$$

$$\text{P\_femto} = \max(\text{P\_femto\_min}, \min(\text{P\_femto3}, \text{P\_max}))$$

Here, Ecp_macro_f1 is the received pilot energy of the strongest macro PSC on f1, Ecp/Io_min is a parameter indicative of the minimum channel quality required for a macro cell user, PL_edge is a parameter representing the boundary of femto cell coverage, Qqualmin_femto is the Qqualmin value for the femto cell PSC read from SIB 11 of the macro cell on f1, pilot_gain is a parameter representing the fraction of the maximum total transmitted femto cell power attributed to the pilot channel, P_femto_min is a parameter corresponding to the minimum (fully loaded) femto cell transmit power, and P_max is a parameter corresponding to the maximum femto cell transmit power.

The power setting P_femto2 relates to preventing access terminals further than PL_edge away from the femto cell from reselecting to the femto cell. This limits the number of reselection attempts by access terminals that are not authorized at that femto cell (e.g., attempts by macro access terminals), and thus improves the standby time of legacy access terminals. The power setting P_femto1 relates to protecting macro access terminals on the same frequency as the femto cell by limiting the transmit power such that when an access terminal is further than PL_edge away from the femto cell, the access terminal hears the macro at an Ecp/Io of roughly Ecp/Io_min. Here, it should be appreciated that a mismatch between the Ecp_macro and Io_macro values at the femto cell versus at the macro access terminal may lead to degradation in Ecp/Io. Also, the presence of an additional interfering femto cell located further than PL_edge from the macro access terminal may lower Ecp/Io by, for example, as much as 3 dB in a worst case scenario. For this reason, the Ecp/Io_min parameter may be set a few dB higher than the Qqualmin value.

Referring again to FIG. 2, as represented at block 204, the access point burst transmit power is defined once the access point transmit power is defined. For example, a femto cell may determine the power at which it will transmit bursts on the femto frequency by adding a margin to the femto power calculated at block 202 as follows:

$$\text{P\_femto\_burst1} = \text{P\_femto3} \cdot \text{femto\_burst\_margin}$$

$$\text{P\_femto\_burst} = \max(\text{P\_femto\_min}, \min(\text{P\_femto\_burst1}, \text{P\_max}))$$

As represented at block 206, the beacon transmit power is defined. Here, a femto cell may determine the standard power level at which it will predominantly transmit beacons on a macro frequency (e.g., frequency f2). As an example, the beacon power may be computed according to the following equations:

$$\text{Io\_beacon} = \text{Io\_f2} + \frac{\max(\text{P\_femto}/ACIR, \text{P\_NF})}{\text{PL\_BE}}$$

$$\text{P\_beacon1} = \left(\frac{\text{Ecp\_macro\_f2}}{\text{Qqualmin}} - \text{Io\_beacon}\right) \cdot \text{PL\_BE}$$

$$\text{P\_beacon2} = \min(\text{P\_beacon1}, \text{P\_max})$$

$$\text{P\_beacon} = \begin{cases} \text{P\_beacon2} & \text{if P\_beacon2} \geq \text{P\_beacon\_min} \\ 0 & \text{otherwise} \end{cases}$$

Here, Io_f2 is the total received signal power measured on frequency f2. ACIR is a parameter corresponding to the adjacent carrier interference ratio, P_NF is a parameter corresponding to the received power of the noise floor of the emission mask, PL_BE is a parameter representing the path loss from the femto cell at which the beacon will likely cause macro Ecp/Io to fall below Qqualmin, Ecp_macro_f2 is the received pilot energy of the strongest macro PSC on f2, Qqualmin is the corresponding value for the strongest macro cell PSC on f2 read from SIB 3, and P_beacon_min is a parameter corresponding to the minimum beacon transmit power.

As represented at block 208 of FIG. 2, the beacon burst transmit power is defined. For example, a femto cell may determine the power at which it will transmit beacon bursts on a macro frequency based on the following equations:

$$\text{P\_beacon\_burst1} = \left(\frac{\text{Ecp\_macro\_f2}}{\text{Qqualmin} \cdot \text{Sintersearch} \cdot \text{beacon\_burst\_margin}} - \text{Io\_f2}\right) \cdot \text{PL\_edge}$$

$$\text{P\_beacon\_burst2} = \min(\text{P\_beacon\_burst1}, \text{P\_max})$$

$$\text{P\_beacon\_burst} = \begin{cases} \text{P\_beacon\_burst2} & \text{if P\_beacon\_burst2} \geq \text{P\_beacon\_min} \\ 0 & \text{otherwise} \end{cases}$$

Here, Sintersearch is the corresponding value from SIB 3 of the strongest macro cell on f2. The beacon burst power is chosen differently to the regular beacon power in this example. Specifically, it is set to trigger an inter-frequency search for access terminals closer than PL_edge from the femto cell. From the above, it is seen that the beacon burst power is set as a function of the network operator's macro cell Sintersearch parameter. This helps to ensures consistent home access terminal discovery of its femto cell at the apartment/house/office boundary, regardless of the macro cell Sintersearch setting. In other words, the beacon burst boundary for a given femto cell may remain substantially constant even if the network changes the value of Sintersearch.

In the above equations, the beacon power is chosen such that macro access terminals further than PL_BE from the femto cell will not be in macro outage (macro Ecp/Io>Qqualmin). In this example, if the macro signal strength is sufficiently poor to begin with, the beacon is switched off to prevent further degradation of macro coverage. The path loss at which the beacon will trigger an inter-frequency search depends on the network's Sintersearch setting, but will be greater than PL_BE provided Sintersearch>0.

Figure 3:
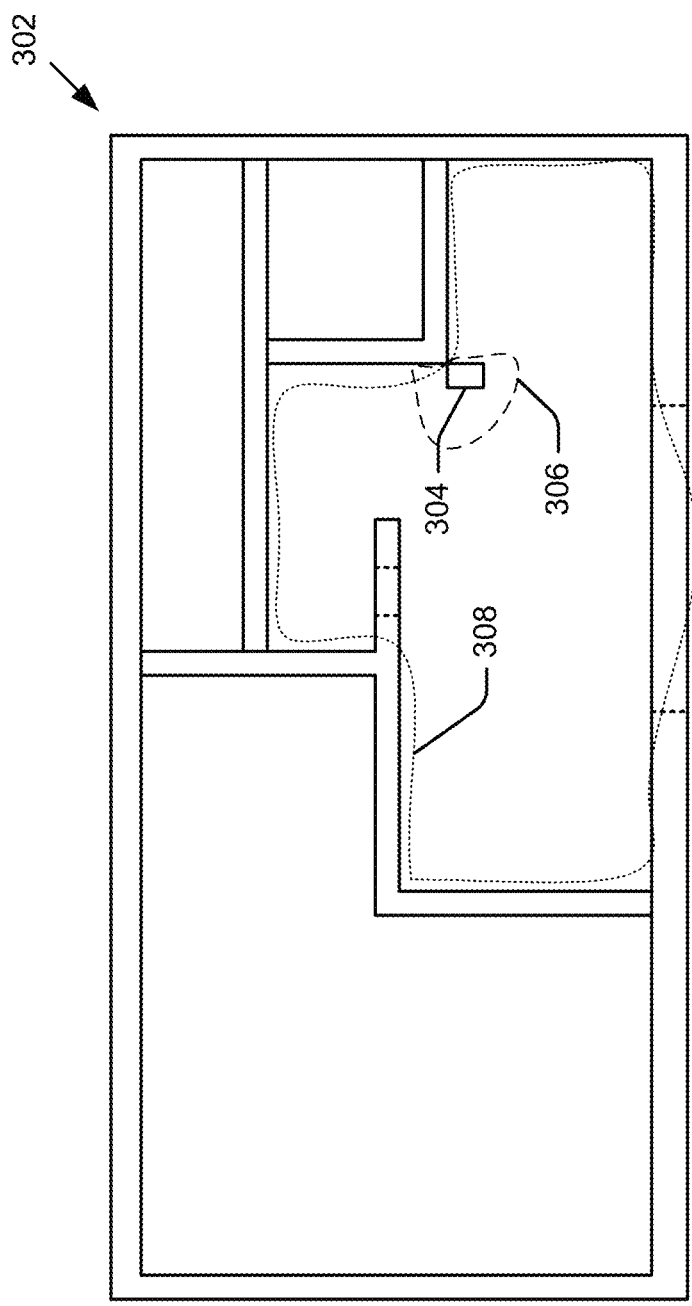
FIG. 3 is a simplified diagram of sample outage and beacon coverage regions.

FIG. 3 illustrates this concept in a simplified manner for an access point 304 deployed in a building 302 (shown in plan view). Here, the boundary of the outage region is represented by the dashed line 306, while the boundary of the beacon coverage region is represented by the dashed line 308.

As mentioned above, in some implementations, the transmission of bursts may be synchronized among multiple access points. For example, a set of femto cells (e.g., all femto cells within a given network or within the coverage of a given macro cell) may synchronize their burst transmissions. Accordingly, as represented by block 210 of FIG. 2, a given access point may optionally determine the burst timing used by at least one other access point.

As represented at block 212, the access point synchronizes its burst transmissions. For example, a femto cell may transmit its femto bursts and its beacon burst at substantially the same time. That is, the bursts are transmitted with a common (i.e., substantially the same) periodicity and with a common burst duration. In addition, as discussed above, in some implementations the access point may synchronize the timing of its burst transmissions with the timing of burst transmissions by at least one other access point.

For purposes of illustration, an example of parameters settings (in dB units) that may be employed in conjunction with the equations described above follows: $Ecp/Ior\_macro=-7$ dB, $Ecp/Io\_min=-16$ dB, $Qqualmin\_femto=-12$ dB, $Qqualmin=-18$ dB, $femto\_burst\_margin=10$ dB, $beacon\_burst\_margin=-8$ dB, $PL\_BE=45$ dB for apartments, 55 dB for houses, 65 dB for office buildings, $PL\_edge=75$ dB for apartments, 85 dB for houses, 95 dB for office buildings, $P\_femto\_min=-30$ dBm, $P\_beacon\_min=-40$ dBm, $P\_max=10$ dBm, $P\_NF=-45$ dBm, $ACIR=33$ dB, $pilot\_gain=-10$ dB.

Figure 4:
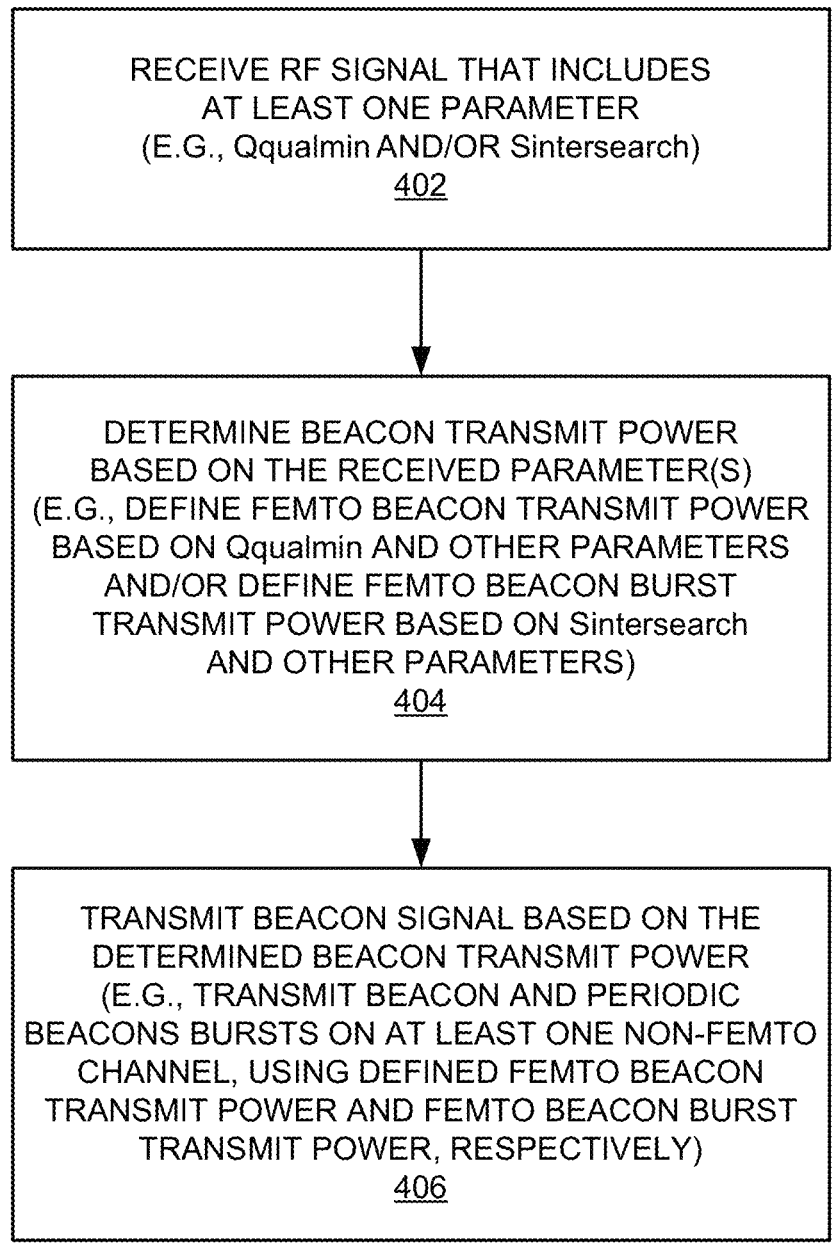
FIG. 4 is a flowchart of several sample aspects of operations that may be performed to determine beacon transmit power based on a received parameter.

Referring now to FIG. 4, sample operations that may be performed by an access point in conjunction with defining beacon power based on one or more parameters that are received over-the-air by an access point are described. These operations are applicable to standard beacon power and/or beacon burst power.

As represented by block 402, the access point receives an RF signal that includes one or more parameters. For example, a femto cell may receive a signal broadcast by a macro access point (e.g., sent by the strongest macro cell from the perspective of the femto cell) on a macro frequency (e.g., frequency f2).

In some cases, the parameter may comprise a minimum required signal quality parameter such as a Qqualmin parameter (e.g., received via a message including SIB 3). In some aspects, a quality parameter such as this may specify a minimum signal quality for an access terminal to sustain a call with an access point (e.g., the macro access point that is broadcasting the parameter).

In some cases the parameter may comprise a search parameter such as an Sintersearch parameter. In some aspects, a search parameter such as this may comprise a value that is defined to control how (e.g., how aggressively) an access terminal searches for other cells.

As represented by block 404, the access point determines beacon transmit power based on the received parameter(s).

For example, a femto cell may compute the standard beacon transmit power based on Qqualmin as discussed above at FIG. 2. Also as discussed above, the computation of the standard beacon transmit power may be based on other parameters such as a defined path loss target (e.g., PL_BE). In some aspects, a path loss target such as this may correspond to an outage region within which transmission of a beacon by the access point causes call drops for an access terminal (e.g., a macro access terminal), and outside of which transmission of a beacon by the access point does not cause call drops for the access terminal.

As another example, a femto cell may compute the beacon burst transmit power based on Sintersearch as discussed above at FIG. 2. Also as discussed above, the computation of the beacon burst transmit power may be based on other parameters such as a defined path loss target (e.g., PL_edge). In some aspects, the determination of the beacon burst transmit power comprises providing a transmit power that results in a search for other cells being triggered at an access terminal if the access terminal is closer than this defined path loss target to the access point.

As represented by block 406, the access point transmits a beacon signal based on the determined beacon transmit power. As discussed herein, the access point may transmit a beacon at the standard beacon transmit power level, with beacon bursts being provided at the beacon burst transmit power level. In the co-channel deployment example described above, the access point may thus transmit the beacon on the macro frequency f2.

Figure 5:
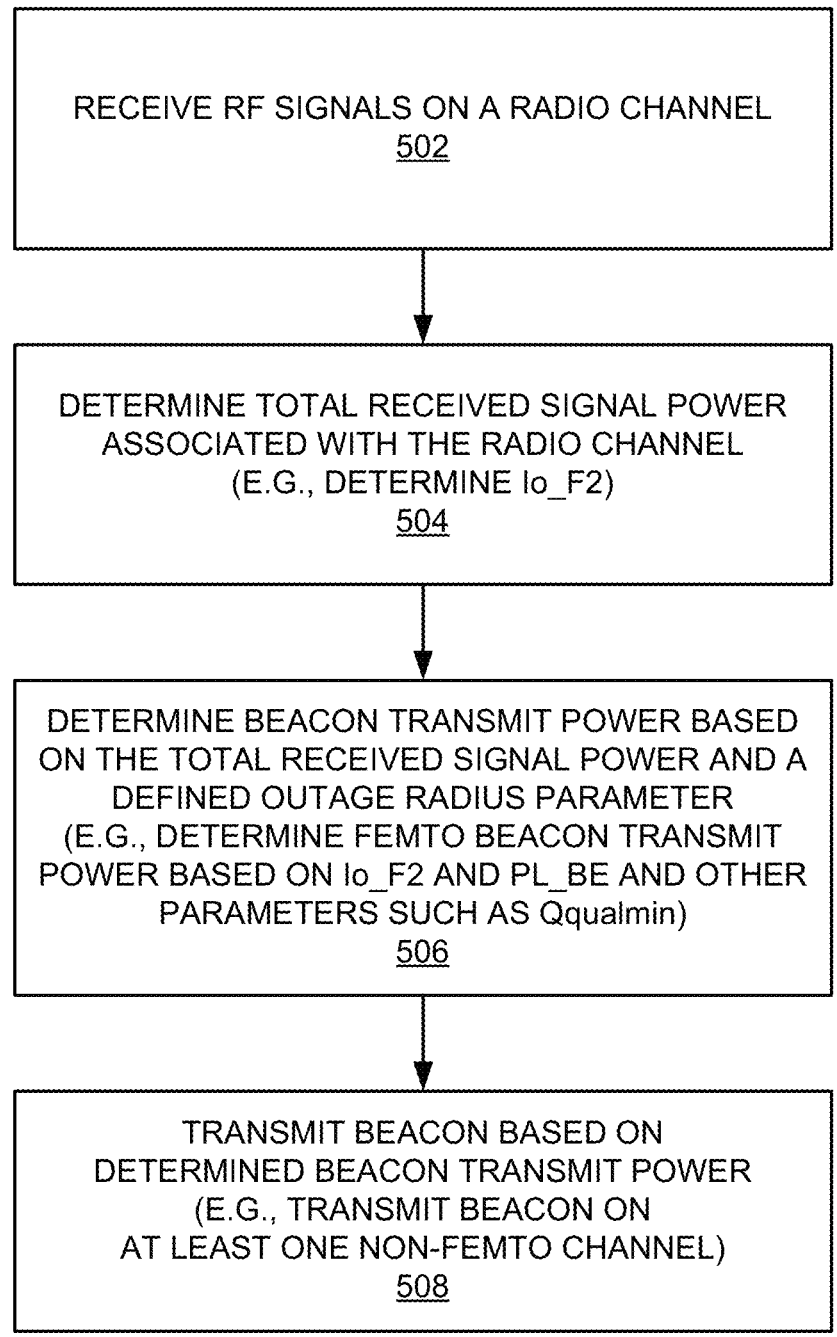
FIG. 5 is a flowchart of several sample aspects of operations that may be performed to determine beacon transmit power based on total received power and a defined outage radius parameter.

FIG. 5 describes sample operations that may be performed in conjunction with defining beacon power based on total received signal power and a defined outage radius parameter.

As represented by block 502, the access point receives RF signals on a radio channel. For example, a femto cell may receive signals broadcast by access points on a macro frequency (e.g., frequency f2).

As represented by block 504, the access point determines the total received signal power associated with the radio channel. This signal power may be based on signals received from multiple macro cells (i.e., not just the strongest macro cell) and from one or more femto cells (or other types of cells operating on the channel). In the example of FIG. 2, this value is designated as Io_f2.

As represented by block 506, the access point determines the beacon transmit power based on the total received signal power (e.g., Io_f2) and a defined outage radius parameter (e.g., PL_BE) as discussed above at FIG. 2. It should be appreciated that the term "radius" here is representative of a distance (e.g., an approximate or average distance) from the access point. The use of this term does not infer that the coverage necessarily comprises a circle. As discussed above, the computation of the beacon transmit power may be based on other parameters such as Qqualmin.

The defined outage radius parameter may comprise a defined path loss target as discussed above. In some cases this path loss may be defined based on the deployment (e.g., the location) of the access point. For example, a larger path loss may be defined if the access point is being deployed in a larger building. As a specific example, a larger path loss may be defined for an access point deployed in a house as opposed to an access point deployed in a smaller apartment.

As represented by block 508, the access point transmits the beacon based on the beacon transmit power determined at block 506 (except when beacon bursts are being transmitted). In the co-channel deployment example described above, the access point may thus transmit the beacon on the macro frequency f2.

FIG. 6 describes sample operations that may be performed in conjunction with defining access point power (e.g., femto cell transmit power) based on a minimum required signal quality parameter (e.g., Qqualmin).

As represented by block 602, the access point receives a minimum required signal quality parameter defined for the access point such as a Qqualmin parameter. In some aspects, a quality parameter such as this may specify the minimum signal quality required at an access terminal for the access terminal to reselect to the access point (e.g., to reselect to the femto cell). In some cases, an access point may receive this parameter via the backhaul. For example, a femto cell may receive the parameter via a message that includes SIB 11 that is sent by a macro access point (e.g., the strongest macro cell currently seen by the femto cell). In the example of FIG. 2, this quality parameter is referred to as Qqualmin_femto.

As represented by block 604, the access point determines the access point transmit power based on the received minimum required signal quality parameter. As discussed above at FIG. 2, the computation of this transmit power may be based on other parameters such as a defined coverage parameter (e.g., PL_edge), the received pilot energy from the strongest macro access point on the femto frequency (e.g., Ecp_macro_f1), and the received energy on the femto frequency from access points of a defined type (e.g., Io_macro_f1). An example of how the latter parameter may be acquired is described in more detail below at FIG. 7.

As represented by block 606, the access point determines access point burst transmit power based on the access point transmit power. For example, a defined margin may be added to the access point transmit power determined at block 604.

As represented by block 608, the access point transmits signals based on the access point transmit power and the access point burst transmit power. In the co-channel deployment example described above, the access point transmits these signals on the femto frequency f1.

FIG. 7 describes sample operations that may be performed in conjunction with defining access point power (e.g., femto cell transmit power) based on the received energy on a channel from access points of a defined type and based on a defined coverage parameter.

As represented by block 702, the access point receives RF signals on a radio channel. For example, a femto cell may receive signals broadcast by access points on the femto frequency (e.g., frequency f1).

As represented by block 704, the access point identifies the received signals that were sent by access points of a defined type (e.g., macro access points). Then, as represented by block 706, the access point determines the received energy associated with the identified signals (i.e., the received energy on the channel solely from the macro access points). In the example of FIG. 2, this quantity is referred to as Io_macro_f1.

As represented by block 708, the access point determines the access point transmit power based on the received energy and a defined coverage parameter (e.g., PL_edge) as discussed above at FIG. 2. Also as discussed above, the computation of this transmit power may be based on other parameters such as Qqualmin_femto and the received pilot energy (e.g., Ecp_macro_f1) from the strongest macro access point on the femto frequency (e.g., determined based on the signals identified at block 704).

As represented by blocks 710 and 712, the access point determines access point burst transmit power based on the access point transmit power, and transmits signals based on the access point transmit power and the access point burst transmit power. Again, the access point may transmit these signals on the femto frequency f1.

As mentioned above, the teachings herein are applicable to a dedicated channel deployment. As an example, in such a case, a femto cell signal may be transmitted on frequency f1 and a beacon transmitted on frequency f2. In this case, the beacon power and the beacon burst power may be calculated in the same manner as described above for the co-channel deployment scenario.

However, the power settings for the femto cell transmit power may be simplified since there is no macro on the femto frequency f1. For example, the femto cell transmit power may be calculate according to the following equations:

$$P\_femto1 = \frac{PL\_edge \cdot Qqualmin\_femto \cdot No}{pilot\_gain}$$

$$P\_femto = \max(P\_femto\_min, \min(P\_femto1, P\_max))$$

Here, No is a parameter representing the thermal noise level at the access terminal. This value is chosen such that an access terminal that is PL_edge from the femto cell will experience a femto Ecp/Io of Qqualmin_femto, in the absence of other, interfering femto cells.

The femto cell burst power is then set in a similar manner as above:

$$P\_femto\_burst1 = P\_femto1 \cdot femto\_burst\_margin$$

$$P\_femto\_burst = \max(P\_femto\_min, \min(P\_femto\_burst1, P\_max))$$

Also, in a sample implementation, the same parameters settings as the co-channel deployment case may be used, with P_femto_min=−30 dBm and No=−99 dBm. These parameter settings may thus lead to the following values for femto cell transmit power:

| Deployment Type | Femto cell power (dBm) | Femto cell burst power (dBm) |
|---|---|---|
| Apartment (PL_edge = 75 dB) | −26 | −16 |
| House (PL_edge = 85 dB) | −16 | −6 |
| Office Building (PL_edge = 95 dB) | −6 | +4 |

FIG. 8 illustrates several sample components that may be incorporated into an access point 802 (e.g., corresponding to the access point 106) to perform power control operations as taught herein. In practice, the described components also may be incorporated into other nodes in a communication system. For example, other nodes in a system may include components similar to those described for the access point 802 to provide similar functionality. Also, a given node may contain one or more of the described components. For example, an access point may contain multiple transceiver components that enable the access point to operate on multiple frequencies and/or communicate via different technologies.

As shown in FIG. 8, the access point 802 includes a transceiver 804 for communicating with other nodes. The transceiver 804 includes a transmitter 806 for sending signals (e.g., transmitting femto signals, femto burst signals, beacon signals, and beacon burst signals, and synchronizing the timing of burst transmissions) and a receiver 808 for receiving signals (e.g., receiving RF signals and parameters). The access point 802 includes a network interface 810 for communicating with other nodes (e.g., other network nodes). For example, the network interface 810 may be configured to communicate with one or more network nodes via a wire-based or wireless backhaul. In some aspects, the network interface 810 may be implemented as a transceiver (e.g., including transmitter and receiver components) configured to support wire-based or wireless communication (e.g., receiving parameters over the backhaul). The access point 802 also includes a transmit power controller 812 (e.g., corresponding to the controller 110) for performing power control-related operations (e.g., determining beacon transmit power, determining total received signal power, determining beacon transmit power, defining access point transmit power, defining access point burst transmit power, defining beacon transmit power, defining beacon burst transmit power, determining transmit power, identifying signals, determining received energy, determining received pilot energy) and other similar operations as taught herein.

In some implementations the components of FIG. 8 may be implemented in one or more processors (e.g., that uses and/or incorporates data memory for storing information or code used by the processor(s) to provide this functionality). For example, the functionality of blocks 810 and 812 (and, optionally, some of the functionality of the transceiver 804) may be implemented by a processor or processors of an access point and data memory of the access point (e.g., by execution of appropriate code and/or by appropriate configuration of processor components).

As discussed above, in some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point (e.g., referred to above as a femto cell). It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 9:
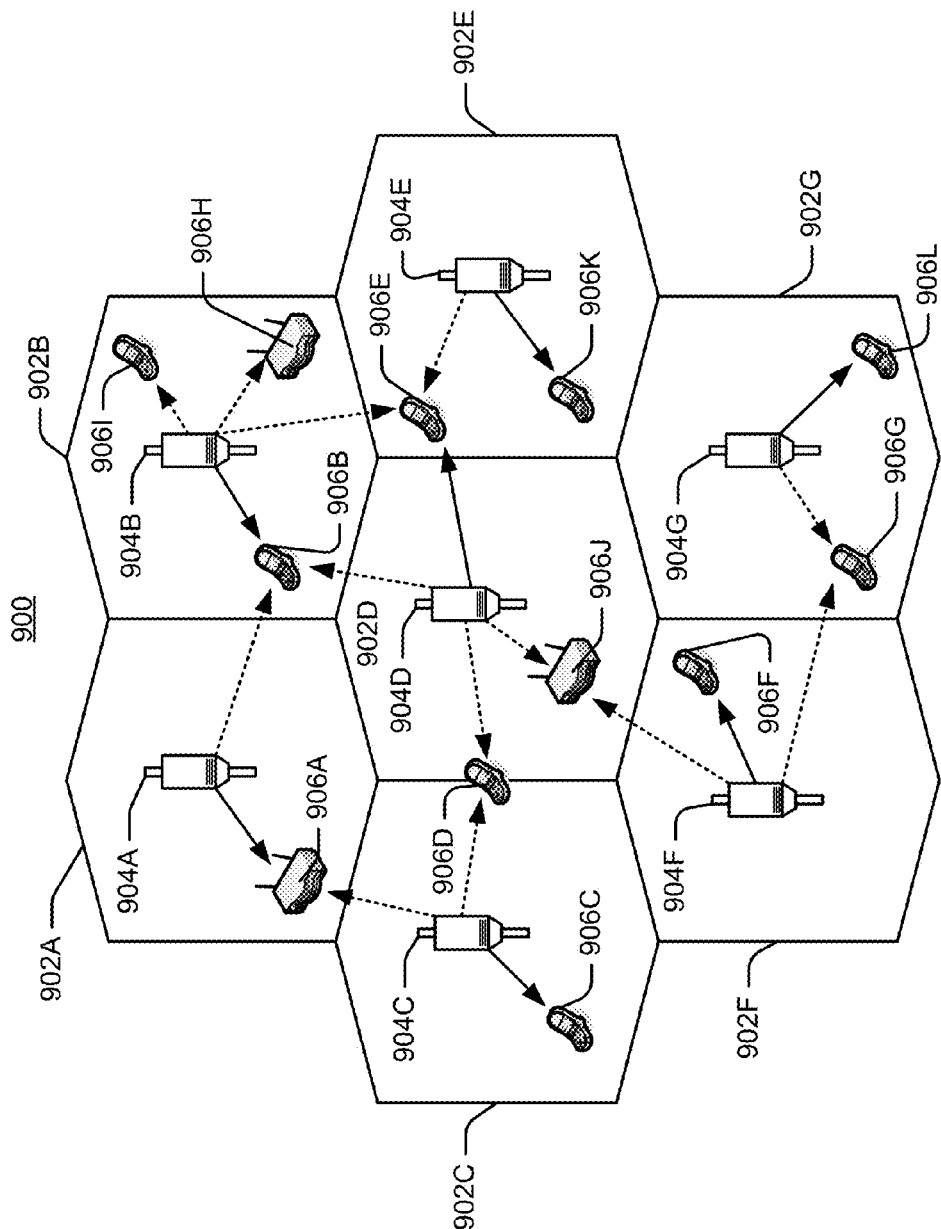
FIG. 9 is a simplified diagram of a wireless communication system.

FIG. 9 illustrates a wireless communication system 900, configured to support a number of users, in which the teachings herein may be implemented. The system 900 provides communication for multiple cells 902, such as, for example, macro cells 902A-902G, with each cell being serviced by a corresponding access point 904 (e.g., access points 904A-904G). As shown in FIG. 9, access terminals 906 (e.g., access terminals 906A-906L) may be dispersed at various locations throughout the system over time. Each access terminal 906 may communicate with one or more access points 904 on a forward link (FL) and/or a reverse link (RL) at a given moment, depending upon whether the access terminal 906 is active and whether it is in soft handoff, for example. The wireless communication system 900 may provide service over a large geographic region. For example, macro cells 902A-902G may cover a few blocks in a neighborhood or several miles in rural environment.

Figure 10:
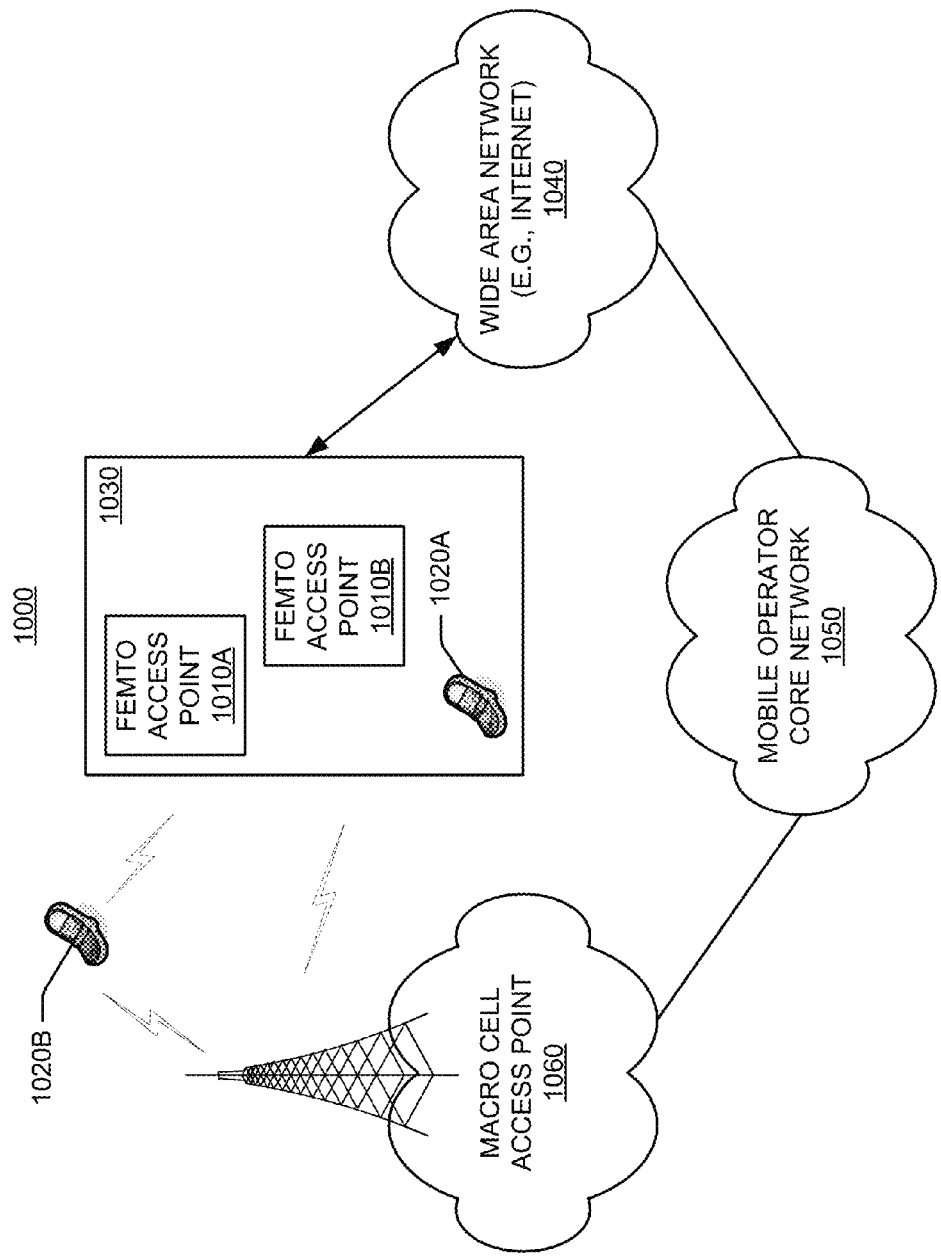
FIG. 10 is a simplified diagram of a wireless communication system including femto nodes.

FIG. 10 illustrates an exemplary communication system 1000 where one or more femto access points are deployed within a network environment. Specifically, the system 1000 includes multiple femto access points 1010 (e.g., femto access points 1010A and 1010B) installed in a relatively small scale network environment (e.g., in one or more user residences 1030). Each femto access point 1010 may be coupled to a wide area network 1040 (e.g., the Internet) and a mobile operator core network 1050 via a DSL router, a cable modem, a wireless link, or other connectivity means (not shown). As will be discussed below, each femto access point 1010 may be configured to serve associated access terminals 1020 (e.g., access terminal 1020A) and, optionally, other (e.g., hybrid or alien) access terminals 1020 (e.g., access terminal 1020B). In other words, access to femto access points 1010 may be restricted whereby a given access terminal 1020 may be served by a set of designated (e.g., home) femto access point(s) 1010 but may not be served by any non-designated femto access points 1010 (e.g., a neighbor's femto access point 1010).

Figure 11:
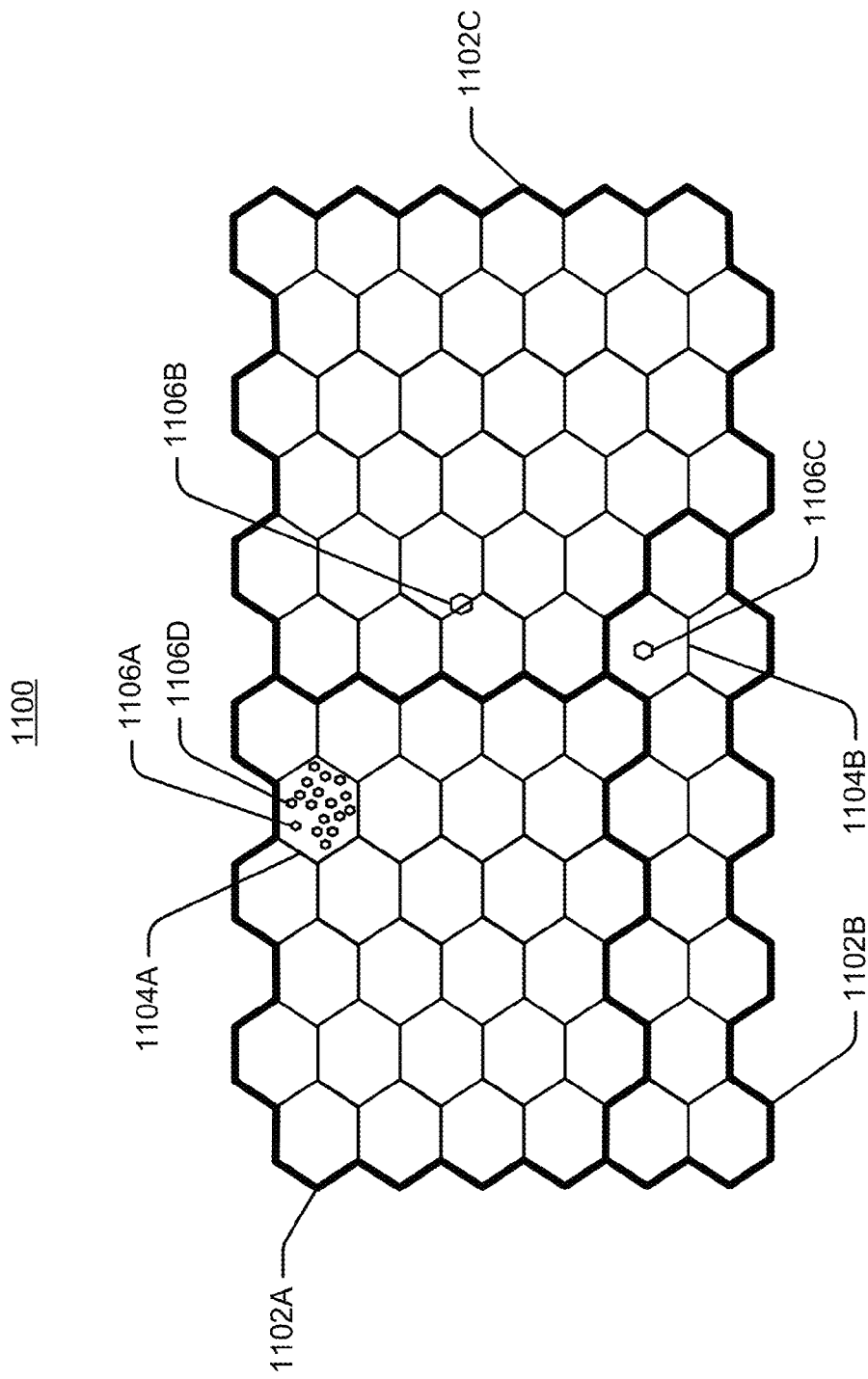
FIG. 11 is a simplified diagram illustrating coverage areas for wireless communication.

FIG. 11 illustrates an example of a coverage map 1100 where several tracking areas 1102 (or routing areas or location areas) are defined, each of which includes several macro coverage areas 1104. Here, areas of coverage associated with tracking areas 1102A, 1102B, and 1102C are delineated by the wide lines and the macro coverage areas 1104 are represented by the larger hexagons. The tracking areas 1102 also include femto coverage areas 1106. In this example, each of the femto coverage areas 1106 (e.g., femto coverage areas 1106B and 1106C) is depicted within one or more macro coverage areas 1104 (e.g., macro coverage areas 1104A and 1104B). It should be appreciated, however, that some or all of a femto coverage area 1106 may not lie within a macro coverage area 1104. In practice, a large number of femto coverage areas 1106 (e.g., femto coverage areas 1106A and 1106D) may be defined within a given tracking area 1102 or macro coverage area 1104. Also, one or more pico coverage areas (not shown) may be defined within a given tracking area 1102 or macro coverage area 1104.

Referring again to FIG. 10, the owner of a femto access point 1010 may subscribe to mobile service, such as, for example, 3G mobile service, offered through the mobile operator core network 1050. In addition, an access terminal 1020 may be capable of operating both in macro environments and in smaller scale (e.g., residential) network environments. In other words, depending on the current location of the access terminal 1020, the access terminal 1020 may be served by a macro cell access point 1060 associated with the mobile operator core network 1050 or by any one of a set of femto access points 1010 (e.g., the femto access points 1010A and 1010B that reside within a corresponding user residence 1030). For example, when a subscriber is outside his home, he is served by a standard macro access point (e.g., access point 1060) and when the subscriber is at home, he is served by a femto access point (e.g., access point 1010A). Here, a femto access point 1010 may be backward compatible with legacy access terminals 1020.

A femto access point 1010 may be deployed on a single frequency or, in the alternative, on multiple frequencies. Depending on the particular configuration, the single frequency or one or more of the multiple frequencies may overlap with one or more frequencies used by a macro access point (e.g., access point 1060).

In some aspects, an access terminal 1020 may be configured to connect to a preferred femto access point (e.g., the home femto access point of the access terminal 1020) whenever such connectivity is possible. For example, whenever the access terminal 1020A is within the user's residence 1030, it may be desired that the access terminal 1020A communicate only with the home femto access point 1010A or 1010B.

In some aspects, if the access terminal 1020 operates within the macro cellular network 1050 but is not residing on its most preferred network (e.g., as defined in a preferred roaming list), the access terminal 1020 may continue to search for the most preferred network (e.g., the preferred femto access point 1010) using a better system reselection (BSR) procedure, which may involve a periodic scanning of available systems to determine whether better systems are currently available and subsequently acquire such preferred systems. The access terminal 1020 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 1010, the access terminal 1020 selects the femto access point 1010 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 1010 that reside within the corresponding user residence 1030). In some implementations, an access point may be restricted to not provide, for at least one node (e.g., access terminal), at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A hybrid (or guest) femto access point may refer to a femto access point on which different access terminals are provided different levels of service (e.g., some access terminals may be allowed partial and/or temporary access while other access terminals may be allowed full access). An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 12:
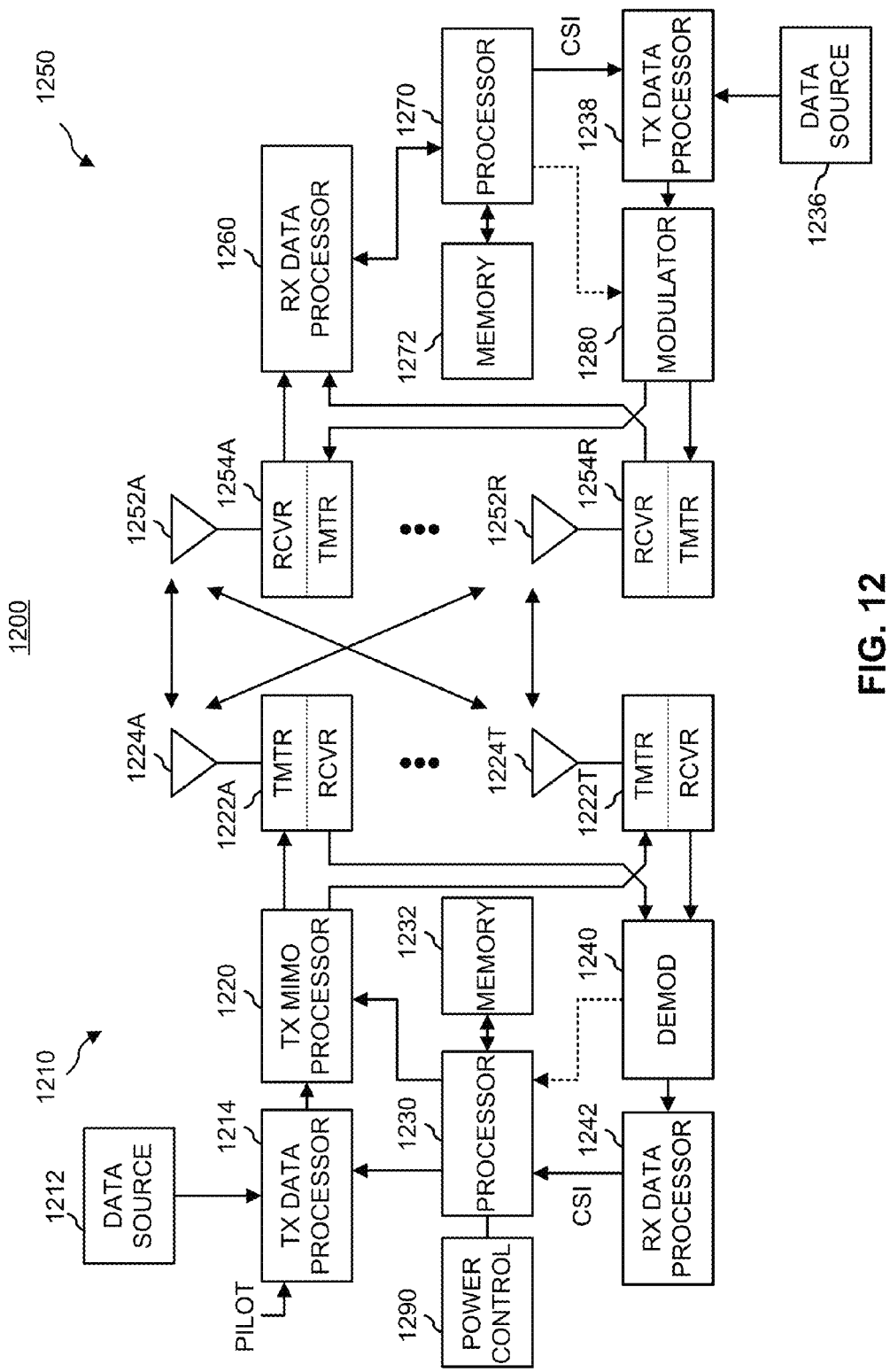
FIG. 12 is a simplified block diagram of several sample aspects of communication components.
Figure 13:
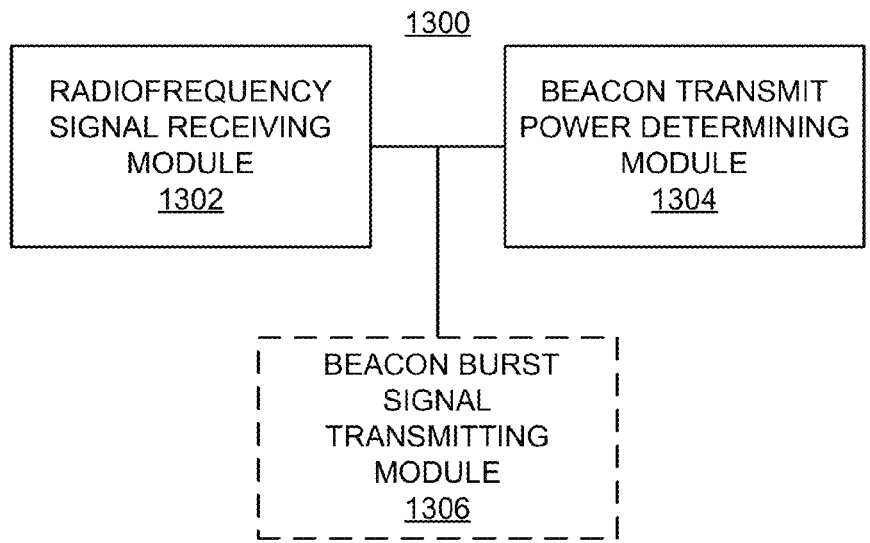
FIGS. 13-17 are simplified block diagrams of several sample aspects of apparatuses configured to provide transmit power control as taught herein.
Figure 14:
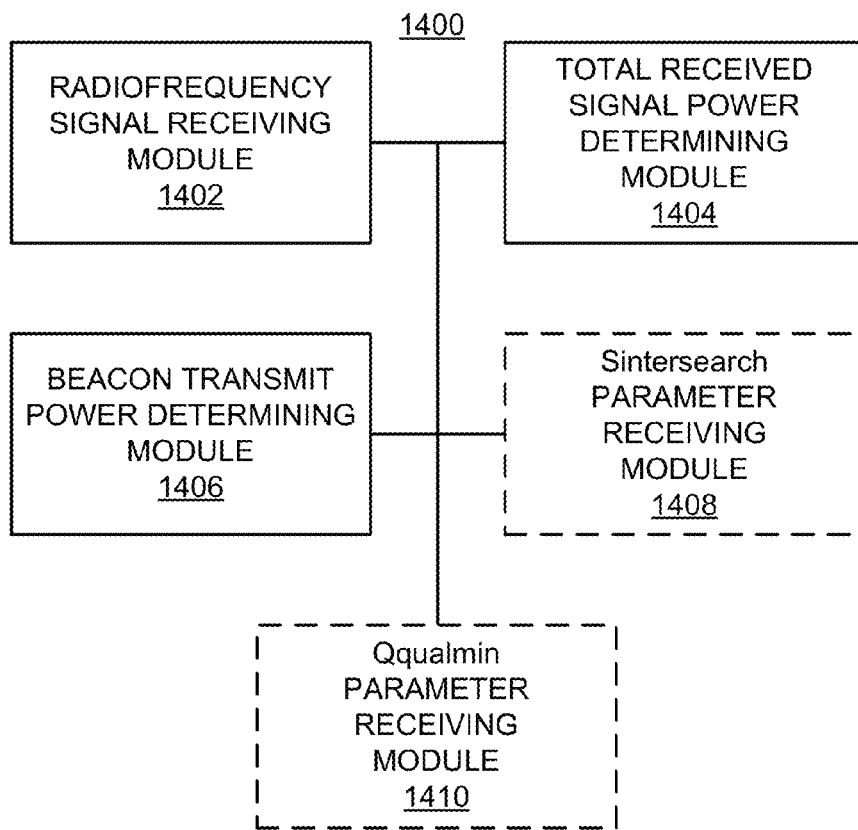
Figure 15:
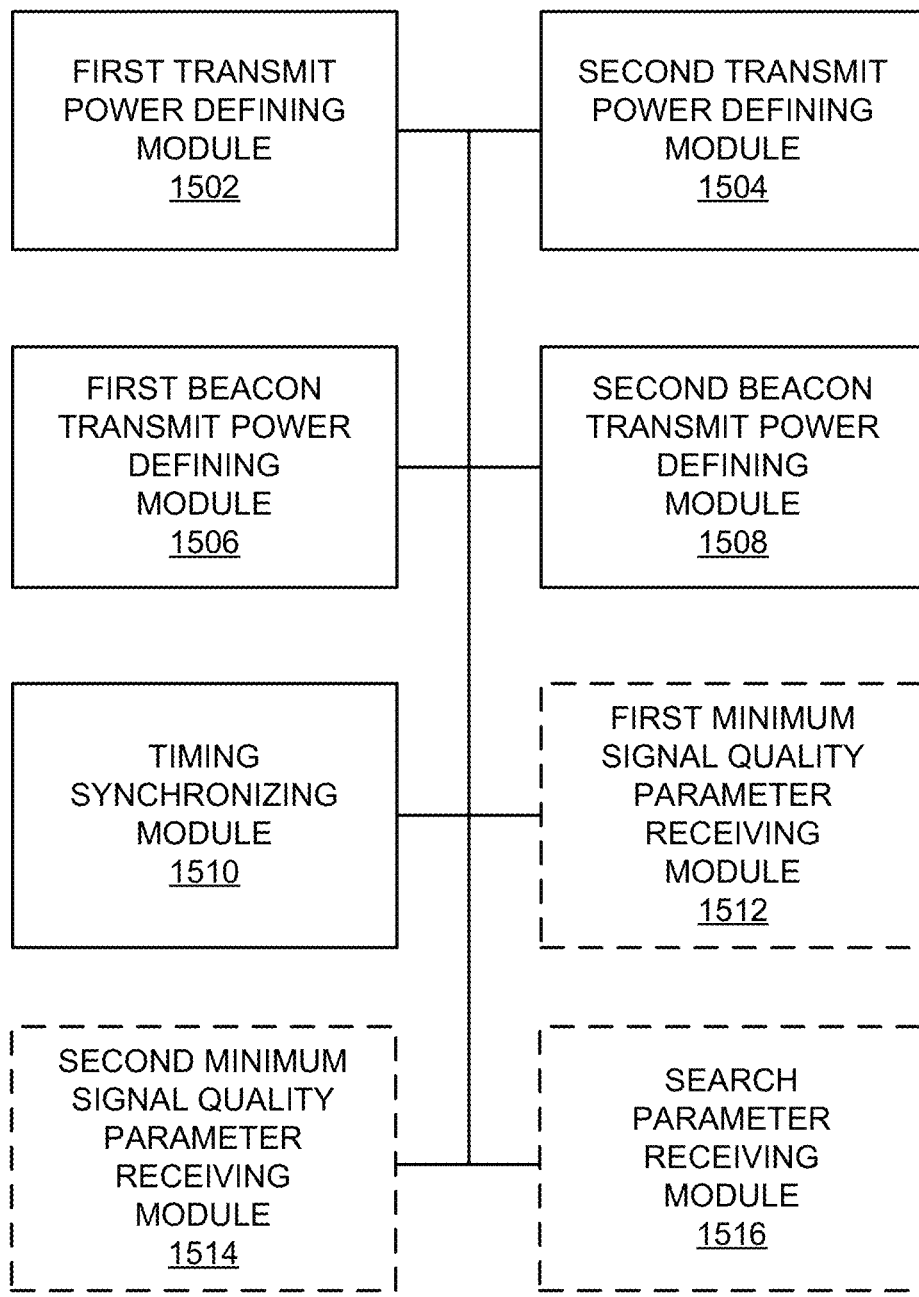
Figure 16:
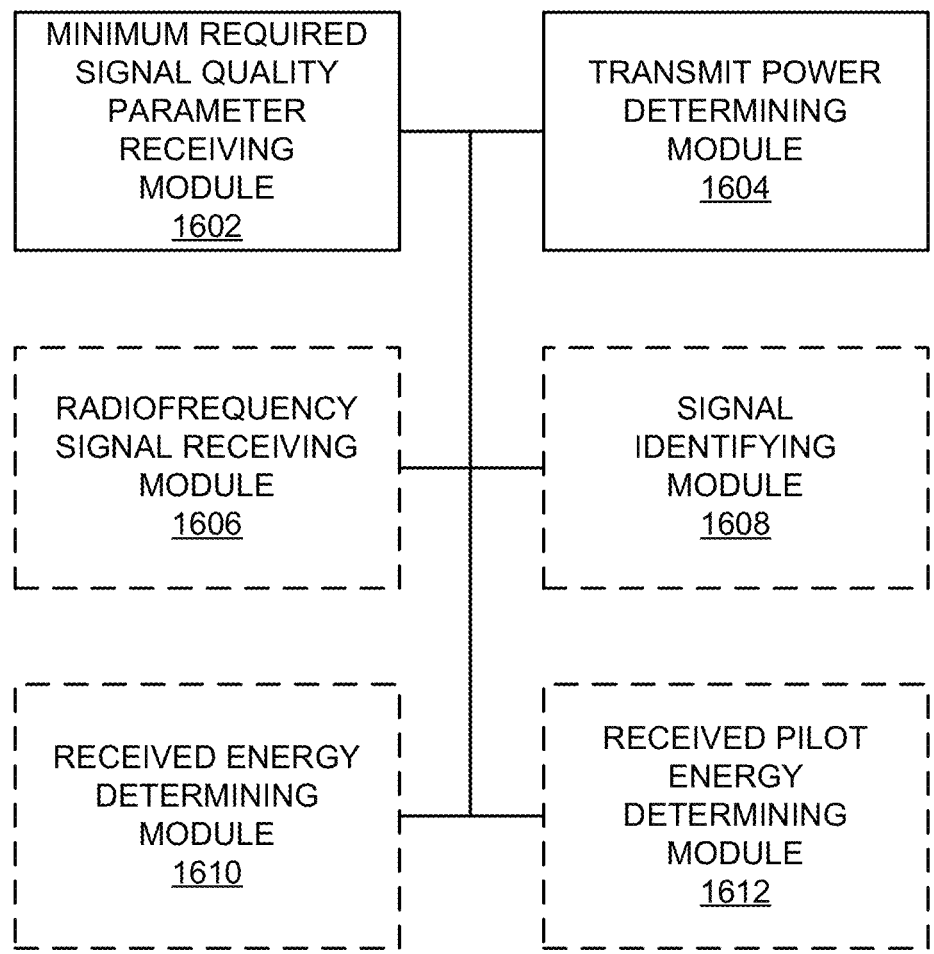
Figure 17:
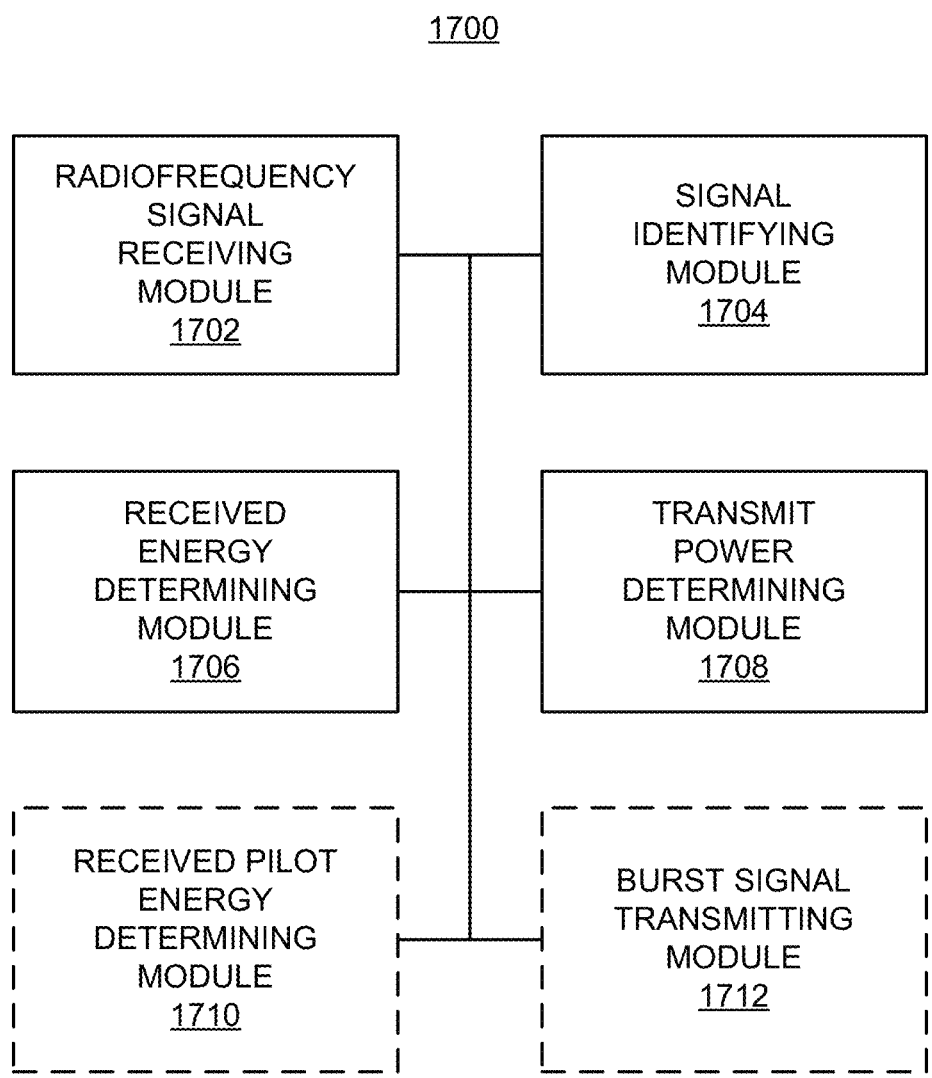

FIG. 12 illustrates a wireless device 1210 (e.g., an access point) and a wireless device 1250 (e.g., an access terminal) of a sample MIMO system 1200. At the device 1210, traffic data for a number of data streams is provided from a data source 1212 to a transmit (TX) data processor 1214. Each data stream may then be transmitted over a respective transmit antenna.

The TX data processor 1214 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1230. A data memory 1232 may store program code, data, and other information used by the processor 1230 or other components of the device 1210.

The modulation symbols for all data streams are then provided to a TX MIMO processor 1220, which may further process the modulation symbols (e.g., for OFDM). The TX MIMO processor 1220 then provides $N_T$ modulation symbol streams to $N_T$ transceivers (XCVR) 1222A through 1222T. In some aspects, the TX MIMO processor 1220 applies beam-forming weights to the symbols of the data streams and to the antenna from which the symbol is being transmitted.

Each transceiver 1222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1222A through 1222T are then transmitted from $N_T$ antennas 1224A through 1224T, respectively.

At the device 1250, the transmitted modulated signals are received by $N_R$ antennas 1252A through 1252R and the received signal from each antenna 1252 is provided to a respective transceiver (XCVR) 1254A through 1254R. Each transceiver 1254 conditions (e.g., filters, amplifies, and downconverts) a respective received signal, digitizes the conditioned signal to provide samples, and further processes the samples to provide a corresponding "received" symbol stream.

A receive (RX) data processor 1260 then receives and processes the $N_R$ received symbol streams from $N_R$ transceivers 1254 based on a particular receiver processing technique to provide $N_T$ "detected" symbol streams. The RX data processor 1260 then demodulates, deinterleaves, and decodes each detected symbol stream to recover the traffic data for the data stream. The processing by the RX data processor 1260 is complementary to that performed by the TX MIMO processor 1220 and the TX data processor 1214 at the device 1210.

A processor 1270 periodically determines which pre-coding matrix to use (discussed below). The processor 1270 formulates a reverse link message comprising a matrix index portion and a rank value portion. A data memory 1272 may store program code, data, and other information used by the processor 1270 or other components of the device 1250.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by the transceivers 1254A through 1254R, and transmitted back to the device 1210.

At the device 1210, the modulated signals from the device 1250 are received by the antennas 1224, conditioned by the transceivers 1222, demodulated by a demodulator (DEMOD) 1240, and processed by a RX data processor 1242 to extract the reverse link message transmitted by the device 1250. The processor 1230 then determines which pre-coding matrix to use for determining the beam-forming weights then processes the extracted message.

FIG. 12 also illustrates that the communication components may include one or more components that perform power control operations as taught herein. For example, a power control component 1290 may cooperate with the processor 1230 and/or other components of the device 1210 to send signals to another device (e.g., device 1250) as taught herein. It should be appreciated that for each device 1210 and 1250 the functionality of two or more of the described components may be provided by a single component. For example, a single processing component may provide the functionality of the power control component 1290 and the processor 1230.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA) systems, Universal Mobile Telecommunication System (UMTS) systems, High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 13-17, apparatuses 1300, 1400, 1500, 1600, and 1700 are represented as a series of interrelated functional modules. Here, a radiofrequency signal receiving module 1302 may correspond at least in some aspects to, for example, a receiver as discussed herein. A beacon transmit power determining module 1304 may correspond at least in some aspects to, for example, a transmit power controller as discussed herein. A beacon burst signal transmitting module 1306 may correspond at least in some aspects to, for example, a transmitter as discussed herein. A radiofrequency signal receiving module 1402 may correspond at least in some aspects to, for example, a receiver as discussed herein. A total received signal power determining module 1404 may correspond at least in some aspects to, for example, a transmit power controller as discussed herein. A beacon transmit power determining module 1406 may correspond at least in some aspects to, for example, a transmit power controller as discussed herein. An Sintersearch parameter receiving module 1408 may correspond at least in some aspects to, for example, a receiver as discussed herein. A Qqualmin parameter receiving module 1410 may correspond at least in some aspects to, for example, a receiver as discussed herein. A first transmit power defining module 1502 may correspond at least in some aspects to, for example, a transmit power controller as discussed herein. A second transmit power defining module 1504 may correspond at least in some aspects to, for example, a transmit power controller as discussed herein. A first beacon transmit power defining module 1506 may correspond at least in some aspects to, for example, a transmit power controller as discussed herein. A second beacon transmit power defining module 1508 may correspond at least in some aspects to, for example, a transmit power controller as discussed herein. A timing synchronizing module 1510 may correspond at least in some aspects to, for example, a transmitter as discussed herein. A first minimum signal quality parameter receiving module 1512 may correspond at least in some aspects to, for example, a receiver as discussed herein. A second minimum signal quality parameter receiving module 1514 may correspond at least in some aspects to, for example, a receiver as discussed herein. A search parameter receiving module 1516 may correspond at least in some aspects to, for example, a receiver as discussed herein. A minimum required signal quality parameter receiving module 1602 may correspond at least in some aspects to, for example, a receiver as discussed herein. A transmit power determining module 1604 may correspond at least in some aspects to, for example, a transmit power controller as discussed herein. A radiofrequency signal receiving module 1606 may correspond at least in some aspects to, for example, a receiver as discussed herein. A signal identifying module 1608 may correspond at least in some aspects to, for example, a transmit power controller as discussed herein. A received energy determining module 1610 may correspond at least in some aspects to, for example, a transmit power controller as discussed herein. A received pilot energy determining module 1612 may correspond at least in some aspects to, for example, a transmit power controller as discussed herein. A radiofrequency signal receiving module 1702 may correspond at least in some aspects to, for example, a receiver as discussed herein. A signal identifying module 1704 may correspond at least in some aspects to, for example, a transmit power controller as discussed herein. A received energy determining module 1706 may correspond at least in some aspects to, for example, a transmit power controller as discussed herein. A transmit power determining module 1708 may correspond at least in some aspects to, for example, a transmit power controller as discussed herein. A received pilot energy determining module 1710 may correspond at least in some aspects to, for example, a transmit power controller as discussed herein. A burst signal transmitting module 1712 may correspond at least in some aspects to, for example, a transmitter as discussed herein.

The functionality of the modules of FIGS. 13-17 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 13-17 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   receiving radiofrequency signals on a radio channel at an access point;
   determining total received signal power associated with the radio channel based on the received radiofrequency signals; and
   determining beacon transmit power for the access point based on the total received signal power and a defined path loss target that corresponds to an outage region within which transmission of a beacon by the access point causes call drops for an access terminal, and outside of which transmission of a beacon by the access point does not cause call drops for the access terminal.

2. The method of claim 1, wherein the defined path loss target is defined based on deployment of the access point.

3. The method of claim 1, wherein the defined path loss target is defined based on a location of the access point.

4. The method of claim 1, wherein the beacon transmit power comprises a lower power level of a multilevel beacon transmit power scheme.

5. The method of claim 1, further comprising:
   receiving an Sintersearch parameter, wherein the determination of the beacon transmit power is further based on the Sintersearch parameter; and
   receiving a Qqualmin parameter, wherein the determination of the beacon transmit power is further based on the Qqualmin parameter.

6. The method of claim 1, wherein the reception of the radiofrequency signals comprises receiving signals from a plurality of access points.

7. The method of claim 1, wherein the access point:
   transmits a beacon signal on the radio channel based on the determined beacon transmit power; and
   transmits data on another radio channel.

8. The method of claim 1, wherein the access point comprises a femto access point.

9. An apparatus for communication, comprising:
   a receiver configured to receive radiofrequency signals on a radio channel at an access point; and
   a transmit power controller configured to determine total received signal power associated with the radio channel based on the received radiofrequency signals, and further configured to determine beacon transmit power for the access point based on the total received signal power and a defined path loss target that corresponds to an outage region within which transmission of a beacon by the access point causes call drops for an access terminal, and outside of which transmission of a beacon by the access point does not cause call drops for the access terminal.

10. The apparatus of claim 9, wherein the defined path loss target is defined based on deployment of the access point.

11. The apparatus of claim 9, wherein the receiver is further configured to:
    receive an Sintersearch parameter, wherein the determination of the beacon transmit power is further based on the Sintersearch parameter; and
    receive a Qqualmin parameter, wherein the determination of the beacon transmit power is further based on the Qqualmin parameter.

12. An apparatus for communication, comprising:
    means for receiving radiofrequency signals on a radio channel at an access point;
    means for determining total received signal power associated with the radio channel based on the received radiofrequency signals; and
    means for determining beacon transmit power for the access point based on the total received signal power and a defined path loss target that corresponds to an outage region within which transmission of a beacon by the access point causes call drops for an access terminal, and outside of which transmission of a beacon by the access point does not cause call drops for the access terminal.

13. The apparatus of claim 12, wherein the defined path loss target is defined based on deployment of the access point.

14. The apparatus of claim 12, further comprising:
    means for receiving an Sintersearch parameter, wherein the determination of the beacon transmit power is further based on the Sintersearch parameter; and
    means for receiving a Qqualmin parameter, wherein the determination of the beacon transmit power is further based on the Qqualmin parameter.

15. A non-transitory computer-readable medium comprising executable code for causing a computer to:
    receive radiofrequency signals on a radio channel at an access point;
    determine total received signal power associated with the radio channel based on the received radiofrequency signals; and
    determine beacon transmit power for the access point based on the total received signal power and a defined path loss target that corresponds to an outage region within which transmission of a beacon by the access point causes call drops for an access terminal, and outside of which transmission of a beacon by the access point does not cause call drops for the access terminal.

16. The non-transitory computer-readable medium of claim 15, wherein the defined path loss target is defined based on deployment of the access point.

17. The non-transitory computer-readable medium of claim 15, wherein the computer-readable medium further comprises code for causing the computer to:
    receive an Sintersearch parameter, wherein the determination of the beacon transmit power is further based on the Sintersearch parameter; and
    receive a Qqualmin parameter, wherein the determination of the beacon transmit power is further based on the Qqualmin parameter.

\* \* \* \* \*